(12) United States Patent
Rune et al.

(10) Patent No.: US 8,284,743 B2
(45) Date of Patent: Oct. 9, 2012

(54) MAINTAINING PREFIX CONSISTENCY IN DYNAMIC MOVING NETWORKS

(75) Inventors: Johan Rune, Lidingö (SE); Tony Larsson, Upplands Väsby (SE); Mattias Pettersson, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 799 days.

(21) Appl. No.: 12/305,163

(22) PCT Filed: Jun. 20, 2006

(86) PCT No.: PCT/SE2006/050211
§ 371 (c)(1), (2), (4) Date: Dec. 16, 2008

(87) PCT Pub. No.: WO2007/149025
PCT Pub. Date: Dec. 27, 2007

(65) Prior Publication Data
US 2009/0207821 A1    Aug. 20, 2009

(51) Int. Cl.
*H04W 4/00* (2009.01)

(52) U.S. Cl. .......................... 370/338; 370/329; 370/331
(58) Field of Classification Search .................... 370/338
See application file for complete search history.

(56) References Cited

U.S. PATENT DOCUMENTS

| | | | |
|---|---|---|---|
| 7,680,114 B2* | 3/2010 | Yazaki et al. | 370/392 |
| 2003/0117965 A1* | 6/2003 | Markki et al. | 370/254 |
| 2004/0253954 A1* | 12/2004 | Lee et al. | 455/436 |
| 2005/0058100 A1* | 3/2005 | Lee et al. | 370/331 |
| 2005/0099971 A1* | 5/2005 | Droms et al. | 370/328 |
| 2006/0221921 A1* | 10/2006 | Kniveton | 370/338 |
| 2007/0097921 A1* | 5/2007 | Choi et al. | 370/331 |
| 2007/0291697 A1* | 12/2007 | Paik et al. | 370/331 |
| 2008/0002684 A1* | 1/2008 | Kumazawa et al. | 370/389 |
| 2008/0219263 A1* | 9/2008 | Kumazawa et al. | 370/392 |
| 2010/0138535 A1* | 6/2010 | Jerrim et al. | 709/224 |

* cited by examiner

*Primary Examiner* — Gary Mui
*Assistant Examiner* — Shaq Taha

(57) ABSTRACT

The present invention relates to arrangements providing a solution for maintaining prefix consistency in dynamic (splitting and merging) moving networks and reducing the negative consequences of splits and mergers.

20 Claims, 8 Drawing Sheets

MAINTAINING PREFIX CONSISTENCY IN DYNAMIC MOVING NETWORKS

TECHNICAL FIELD

The present invention relates to moving networks and multi-access. In particular, the present invention relates to arrangements and methods for maintaining network prefix consistency in moving networks.

BACKGROUND

The present invention is to be applied in a moving network, wherein multiple mobile routers (MR) share the same network prefix and preferably also have a mutual home agent (HA).

The following section illustrates a moving network involving multiple mobile routers. A scenario with Vehicle Area Network (VAN) with Multiple MRs is illustrated in FIG. 1 and comprises a network within a public transportation vehicle (e.g. bus, train, airplane). The internal network within the vehicle is some sort of switched Ethernet which may have both Ethernet ports and WLAN access points (APs) deployed. The internal network also has multiple MRs, as illustrated in FIG. 1, which act as gateways for external communication for all nodes inside the vehicle. The MRs are also responsible for mobility management for the entire network, i.e. mobility management is totally transparent to the nodes entering the vehicle. This means that no new requirements are put on the client nodes also known as the Mobile Network Nodes (MNNs)). The MRs share the same HA and the same network prefix from the address range of the home network. This facilitates their shared responsibility for the mobility management of the moving network. For instance, using one and the same HA simplifies administration and sharing the same network prefix avoids the problem of synchronizing source address selection and router selection.

A reason for having multiple MRs may be to provide several external accesses to the VAN, possibly using several different access technologies. In this scenario example there are two MRs in the VAN, providing external access via the three different access technologies GPRS, WCDMA, and satellite. Several of these accesses can be available at the same time depending on for instance coverage and operator policies. There are several reasons motivating why support for simultaneous usage of several accesses is beneficial in this scenario, including e.g. robustness, increased aggregated bandwidth and different application/user requirements/preferences.

FIG. 1 also shows the home network and the home agent (HA) that the MRs are communicating with. The MRs will need to establish one tunnel to the home agent for each available external access. The example in FIG. 1 shows three tunnels from the MRs (two from the MR1, one from MR2) to the home agent.

The present invention builds on the NEMO Basic Support protocol described in Vijay Devarapalli et al., "Network Mobility (NEMO) Basic Support Protocol", RFC 3963, January 2005.

Further, the present invention assumes extensions to the NEMO Basic Support protocol with functions needed to enable multiple mobile routers to share the same network prefix.

The NEMO Basic Support protocol is defined for IPv6 only. It allows a mobile router (MR) to maintain a stable network prefix (denoted Mobile Network Prefix, MNP) for a moving network, even as the MR changes its, and thus the moving network's, point of attachment to a fixed network infrastructure.

The prefix stability is achieved through a Mobile IPv6-like solution by making a home agent (HA) a fixed point of presence for the MR and maintaining connectivity between the HA and the MR through a bi-directional tunnel. The prefix is allocated from the address range of the home network, i.e. the subnet to which the HA is attached, and can thus remain the same even as the MR and its network moves. When the MR attaches to a network in a new location, it acquires a new care-of address, but its home address and prefix are unchanged. However, just like in Mobile IPv6 (MIPv6) [described in D. Johnson et al., "Mobility Support in IPv6", RFC 3775, June 2004) the MR has to register its new care-of address in the HA in order to maintain the MR-HA tunnel.

The nodes belonging to the network cluster that moves along with the mobile router are called Mobile Network Nodes (MNNs). In NEMO Basic Support they will not change their configuration as the MR changes its point of attachment. In other words, the mobility is transparent to them.

Presently the NEMO Basic Support protocol allows only a single care-of address to be registered in the HA for a certain MR at any one time. Multiple simultaneous care-of addresses are not allowed and thus multiple simultaneous accesses and MR-HA tunnels are not possible for a MR.

Furthermore, the NEMO Basic Support protocol assumes that the MR is preconfigured with the network prefix that is allocated to the MR out of the address range of the home network (or other prefix range supported by the HA).

As an option in the NEMO Basic Support protocol, the MR and the HA uses a regular routing protocol between each other on their mutual "link", i.e. through the MR-HA tunnel. With this option the HA does not have to have any special intelligence to handle announcement of prefixes that are being used by "active" MRs (i.e. MRs that have valid bindings in the HA). This is instead handled automatically by the routing protocol in the regular manner.

A dynamic moving network scenario with a Personal Area Network (PAN) with Multiple MRs that provide the external access to the PAN is illustrated in FIG. 2.

The PAN can for instance be the gadgets/devices that the user is carrying with him/her or the network within the user's personal car. The PAN consists of a switched Ethernet network based on for instance Bluetooth running the PAN profile. The MRs act as routers within the PAN as well as for external network access. The MRs are also responsible for mobility management of the moving network, i.e. the PAN. As in the VAN with multiple MRs scenario, the MRs in the PAN share the same HA and the same prefix from the address range of their home network.

The external accesses provided by the MRs can for instance, as in this scenario example, consist of a cellular phone providing WCDMA access and a PDA providing WLAN access. These accesses may be available at the same time. The benefits of having multiple MRs and multiple external accesses are more or less the same as in the VAN with multiple MRs.

The MRs are communicating with the home agent (HA) deployed in the home network. The MRs need to establish a tunnel to the home agent for each available external access. The example in FIG. 2 shows two tunnels from the (single/merged) PAN to the home agent.

The PAN is an example of a potential dynamic moving network scenario whereby the owner's different devices can together form a single PAN or several "sub-PANs" (with one or more MRs in each "sub-PAN") and changes between these two states may occur dynamically. Even though the user more or less brings a number of devices along in his/her daily life, the devices may not be close enough to each other to communicate at all times. A couple of devices may for instance be left at the user's office desk, while others are brought to a meeting. In another example some of the devices in the user's PAN more or less never leave the home. They are part of the merged PAN together with the user's mobile devices when the user is at home, but when the user is away from home his/her home devices form one sub-PAN and his/her mobile devices form another sub-PAN. Still, the home devices may stay connected to a network infrastructure to allow communication in general and specifically to allow the user to communicate with the home devices, e.g. for retrieving information (e.g. from a surveillance camera) or for remote control (e.g. house heating or the kitchen oven). FIG. 2 illustrates this potential dynamics.

Another dynamic scenario with a train is illustrated in FIG. 3 and involves a train with multiple cars. The cars may be connected and disconnected in various combinations. In order for each car to be able to function independently, each car has one or more (typically one) MR(s) with external access(es) and one or more access point(s) (AP(s)) for the MNNs constituting an independent moving network. When two cars are connected, their respective moving networks are merged (through a simple connector or a layer 2 bridge device). Thus, the network devices in all the cars of a train typically constitute a single moving network with multiple MRs.

When a car is disconnected from a train, the moving network is divided into two moving networks, one in the disconnected car and the other one in the remaining car(s).

The MRs of the moving network becomes resources that are shared by the MNNs, i.e. the MRs together serve the moving network, providing the MNNs with external network access (e.g. through WCDMA, GPRS and/or a satellite link, as depicted in FIG. 3).

An MR may be a separate node or merged with an AP. In addition, the MRs (and the moving networks of the respective cars) may be merged/connected via wireless links instead of wires. In such a scenario all MNNs and MRs will not necessarily be able to hear (i.e. be within radio communication range) of all other MNNs and MRs.

Naturally, it is also possible to have a single MR in the entire train, e.g. in the train's engine, which single-handedly serves the moving network of the entire train, but this option suffers from a number of disadvantages:

The external connectivity from a car is dependent on its connection with an engine with a MR. If a car, or a set of cars, is disconnected from the engine, e.g. during reshuffling of cars among different trains, the external connectivity is broken.

Unless all engines are equipped with MRs, an upgraded car (i.e. a car with connectivity) will sometimes not be able to serve its users with external connectivity, because it happens to be connected to a "legacy" engine without a MR. The same problem occurs if there is a "legacy" car without connectivity in the train (unless this car is located at the end of the train). Therefore, due to the bad migration properties, all cars behind the "legacy" car will be disconnected from the engine MR and will thus have no external connectivity.

In order for the engine MR to provide external connectivity to a car, all the cars between the engine and the concerned car have to support connectivity. A train company might not want to equip e.g. cooling cars or cargo cars with connectivity means and it may not want to be limited to placing such cars at the end of the train either. That implies that the flexibility is bad.

The MR deployed in an engine has to be dimensioned for the worst case, i.e. largest conceivable train. If, in contrast, MRs are placed in each car, the MR capacity of the moving network in the train inherently handles scaling to different sizes. Each car that is added to the train would then also add the MR capacity that it needs to the moving network. The rigid dimensioning wastes performance, due to poor or no dynamic scalability.

A single MR in a train is a weakness in a wireless environment, because it represents a single point of failure in terms of radio contact. The MR may have several redundant interfaces using different wireless technologies, but nevertheless it is a disadvantage when the access links with the highest capacity, e.g. WLAN, are unavailable. In addition, in certain situations all the MR's access links may be simultaneously unavailable, e.g. when the train passes through a tunnel that has no specific support for wireless communication installed. If instead a MR is placed in each car, wireless transceivers and antennas are distributed throughout the train. This increases the chance that at any given moment at least one or a few MRs have access to the highest capacity access. It also greatly reduces the risk that the train looses all its external access links simultaneously.

A single MR in a train is itself a single point of failure. When the MR is out of service due to restarts, software or hardware errors, the entire train looses its external communication possibilities. The countermeasures, duplicate MRs in the engine, or a single MR with advanced internal redundancy and error correction properties are expensive and a waste of resources (since abundant resources that seldom are used are deployed). With a MR in each car robustness is inherently achieved through the redundancy that the multiple MRs provide for each other.

Further, a single MR serving an entire train has to bear all the load of the external traffic itself. It is therefore desired to have multiple MRs, since a distributed MR principle with multiple MRs provides inherent possibilities for load sharing. It would be more efficient to provide high external access link capacity by aggregating the access link capacity of distributed multiple MRs than to equip a single engine MR with an excess of external access interfaces in order to be able to handle the most capacity-demanding cases.

Although the NEMO Basic Support protocol is limited to a single MR and a single MR-HA tunnel, the present invention assumes extensions to the scope and mechanisms of the NEMO Basic Support protocol to encompass and support multiple MRs as well as dynamic prefix assignment, i.e. a mechanism allowing a HA to dynamically assign a prefix to a MR.

The MRs of a moving network are assumed to share the same HA, in order to simplify administration, and the same network prefix, in order to avoid the problem of synchronizing source address selection and router selection.

Although the NEMO Basic Support protocol does not prevent two MRs from having the same network prefix, there is no explicit support for this either. Therefore, in view of the problems associated with such scenarios, using the NEMO Basic Support protocol for MRs sharing the same prefix may result in serious malfunctioning.

When multiple MRs share the same network prefix, it must be ensured that the MRs are actually attached to the same link, e.g. by using a local connectivity test. Otherwise inconsistent routing tables and malfunctioning routing in the HA will occur. As a concrete example, a packet destined for MNN X, connected to link α via MR A may instead be routed to link β via MR B, because MR A and MR B share the same network prefix on which the routing is based.

Thus, one side of what could be labeled "prefix consistency" is that MRs sharing the same prefix must be connected to the same moving network in order to ensure properly functioning communication and avoid routing problems. The other side of prefix consistency is that all MRs connected to the same moving network should use the same prefix. Otherwise other routing and communication problems arise. The reason is that a MNN will build an IP address from all prefixes that are advertised in the moving network, but it is not required to associate a prefix (or its resulting IP address) with the MR that advertised it. Hence, a MNN can choose any of its addresses as the source address of a packet and choose to send the packet to any of the available MRs, and these two choices (source address selection and MR selection) are independent of each other. If a MNN e.g. chooses to use an address with prefix A as the source address and sends the packet to a MR that uses prefix B instead of A, then the packet will most likely be dropped by ingress filtering. Ingress filtering can occur in the MR, but it may also occur in nodes beyond the MR, e.g. in the HA.

The management of the prefix such that prefix consistency is achieved is particularly a challenge when the mobile network is involved in a split or a merger.

The Internet-Draft "Token based Duplicate Network Detection for split mobile network (M. Kumazawa et al., "Token based Duplicate Network Detection for split mobile network (Token based DND)", Internet-Draft: draft-kumazawa-nemo-tbdnd-2, July 2005) describes a solution that has as one of its purposes to enable detection of a moving network split.

The solution is based on a token that is associated with a prefix. The MR that "owns" the prefix generates the token and sends it to the HA in the Binding Update (BU) and then includes it in its Router Advertisements. If another MR subsequently sends a BU with the same prefix in the Mobile Network Prefix option it has to include the token associated with the prefix (assumedly received in a Router Advertisement from the "owner" of the prefix). The HA compares the prefix and token with the ones it has previously stored and if they match, the MR is accepted as a "borrower" of the prefix. If the MR fails to supply this token or supplies another token, the HA will not accept the MR as a "borrower" of the prefix.

A "borrower" of a prefix supports the "borrowed" prefix for routing purposes, but does not advertise its associated token in its Router Advertisements. The "owner" of a prefix repeatedly updates the associated token during Binding Update procedures.

If a moving network is split such that the "owner" and the "borrower" of a prefix ends up in separate moving networks, the HA will eventually discover this. The "borrower" of the prefix will not be able to refresh its right to use the prefix (during a Binding Update procedure), when the "owner" of the prefix (the "borrower" unknowingly) has updated the associated token.

The token based solution has several disadvantages. A major drawback is its poor temporal properties. The age of a verified local connectivity depends on the token update period, which is no better than the Binding Update period. This directly translates into the time required to detect a moving network split and the regular Binding Update period is far too long.

A security related problem is that the solution has no protection against a malicious MNN or MR that hi-jacks the token and pretends to be the owner of the prefix. Thus, a malicious node may trigger a false split detection (by falsely updating the token) or, at least temporarily, hide a true moving network split (by advertising the token).

SUMMARY

As stated above, it is a problem to maintain prefix consistency in a dynamic multi-MR moving network, i.e. during splits and mergers of the moving network. A prefix change impacts not only the involved MR(s), but also the MNNs in the moving network. When the prefix of a moving network changes, the MNNs lose external connectivity and their external sessions (connections to nodes that are external to the moving network) are broken. They will not be able to establish new sessions until they switch to the new prefix.

The object of the present invention is therefore to achieve arrangements and methods that make it possible to maintain the network prefix consistency when the mobile network is involved in a split or a merger.

According to a first aspect, the object is achieved by a first MR connectable to a first moving network associated to a HA, the first moving network comprises at least a second MR, wherein each of the MRs is adapted to have a relation with said HA and to be assigned a first set of network prefixes identifying the first moving network. The first MR, comprising means for determining that the first moving network is split into a second and a third moving network such that the first MR belongs to the second moving network, means for transmitting a request to said HA to be re-assigned the first set of network prefixes, and means for being re-assigned the first set of network prefixes if local connectivity between the first MR and all other MRs that are assigned the first set of network prefixes can be verified, makes it possible to maintain the network prefix consistency when the mobile network is involved in a split.

According to one embodiment, the first MR further comprises means for waiting a time period after determining that the first moving network has been split before transmitting a request to said HA to be re-assigned the first set of network prefixes and means for selecting the length of said time period based on the number of nodes in the second moving network, such that a greater number of nodes results in a longer time period than a smaller number of nodes.

According to an alternative embodiment, the first MR comprises means for waiting a time period after determining that the first moving network has been split before transmitting a request to said HA to be re-assigned the first set of network prefixes and means for selecting the length of said time period based on a value associated with the second moving network, such that a higher value results in a longer time period than a smaller value, wherein the value is a measure of the consequences of changing the set of network prefixes such that a greater value is an indication of a greater consequence of a prefix change.

According to a second aspect, the object is achieved by a first MR connectable to a first moving network associated to a HA and adapted to be assigned a first set of network prefixes identifying the first moving network. The first MR, comprising means for determining that the first moving network is merged with a second moving network into a third moving network, the second moving network comprises at least a second MR, wherein each of the at least second MR has a relation with said HA and is assigned a second set of network prefixes identifying the second moving network, means for comparing, between the first and second moving networks, a predetermined characteristic indicative of the consequence of a prefix change of the respective moving network, and means for transmitting a request to said HA to be assigned the second set of network prefixes based on a result of said comparison, makes it possible to maintain the network prefix consistency when the mobile network is involved in a merger.

According to a third aspect, the object is achieved by a method in a first mobile router connectable to a first moving network associated to a home agent, HA, the first moving network comprises at least a second MR, wherein each of the MRs is adapted to have a relation with said HA and to be assigned a first set of network prefixes identifying the first moving network. The method, comprising the steps of determining that the first moving network is split into a second and a third moving network such that the first MR belongs to the second moving network, transmitting a request to said HA to be re-assigned the first set of network prefixes, and being re-assigned the first set of network prefixes if local connectivity between the first MR and all other MRs that are assigned the first set of network prefixes can be verified, makes it possible to maintain the network prefix consistency when the mobile network is involved in a split.

According to an embodiment, the method comprises the further step of waiting a time period after determining that the first moving network has been split before transmitting a request to said HA to be re-assigned the first set of network prefixes and selecting the length of said time period based on the number of nodes in the second moving network, such that a greater number of nodes results in a longer time period than a smaller number of nodes.

According to an alternative embodiment, the method comprises the further step of waiting a time period after determining that the first moving network has been split before transmitting a request to said HA to be re-assigned the first set of network prefixes and selecting the length of said time period based on a value associated with the second moving network, such that a higher value results in a longer time period than a smaller value, wherein the value is a measure of the consequences of changing the set of network prefixes such that a greater value is an indication of a greater consequence of a prefix change.

According to a fourth aspect, the object is achieved by a method in a first MR connectable to a first moving network associated to a HA and adapted to be assigned a first set of network prefixes identifying the first moving network. The method, comprising the steps of determining that the first moving network is merged with a second moving network into a third moving network, the second moving network comprises at least a second MR, wherein each of the at least second MR has a relation with said HA and is assigned a second set of network prefixes identifying the second moving network, comparing, between the first and second moving networks, a predetermined characteristic indicative of the consequence of a prefix change of the respective moving network, and transmitting a request to said HA to be assigned the second set of network prefixes based on a result of said comparison, makes it possible to maintain the network prefix consistency when the mobile network is involved in a merger.

An advantage of the present invention is that network prefix consistency is maintained in a dynamic moving network environment. It ensures that only one of the moving networks (the largest) resulting from a moving network split keeps the old network prefix while the others change. It also ensures that all MRs in a moving network share the same network prefix or prefixes, particularly after a moving network merger.

A further advantage is that the invention assures functioning routing in a dynamic moving network environment.

A further advantage is that the invention minimizes the impact of network prefix changes in conjunction with splits and mergers of moving networks by limiting the network prefix change to the smallest involved moving network(s).

A further advantage is that the invention minimizes the negative consequences of network prefix changes for MNNs.

A further advantage is that the invention has no impact on MNNs in terms of new requirements on functions or behavior. This is an important property of the invention to avoid backwards compatibility problems and other deployment problems, since potential MNNs are numerous and hard to control in terms of implemented software, whereas MRs are few and assumedly under administrative control.

A further advantage is that the invention in its basic form builds on existing protocols.

DETAILED DESCRIPTION

Figure 1:
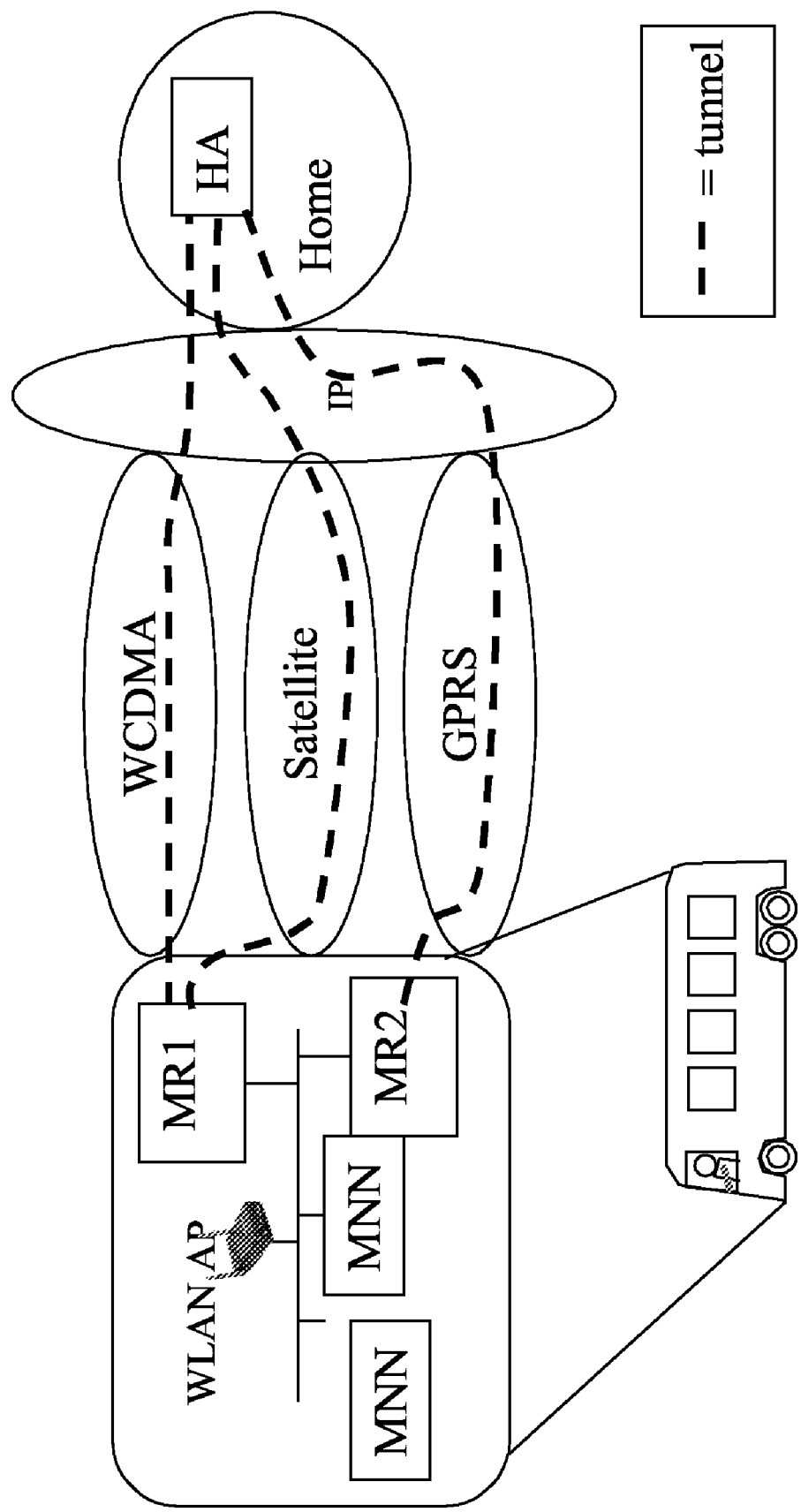
FIGS. 1-3 illustrate different moving networks wherein the present invention may be implemented.
Figure 2:
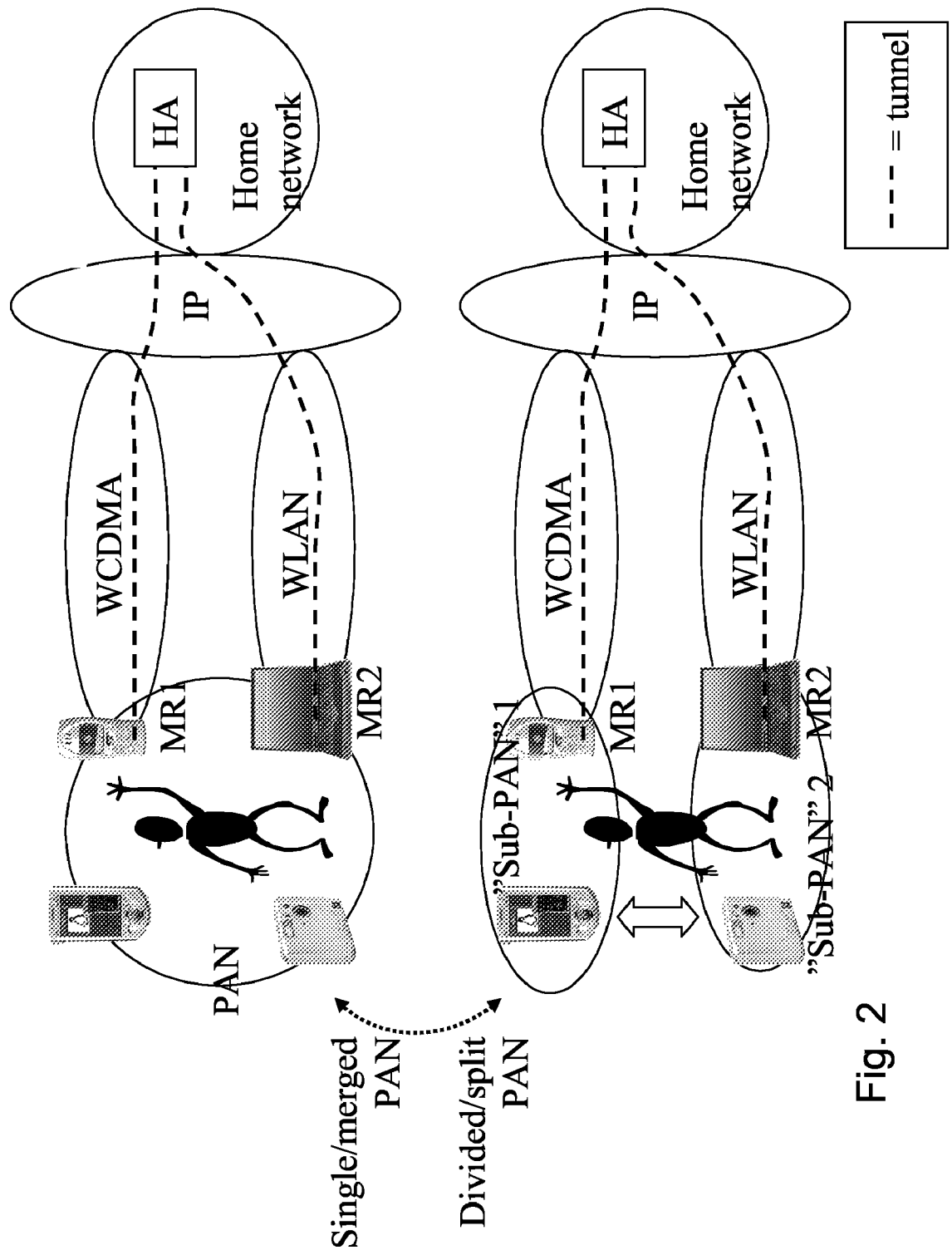
Figure 3:
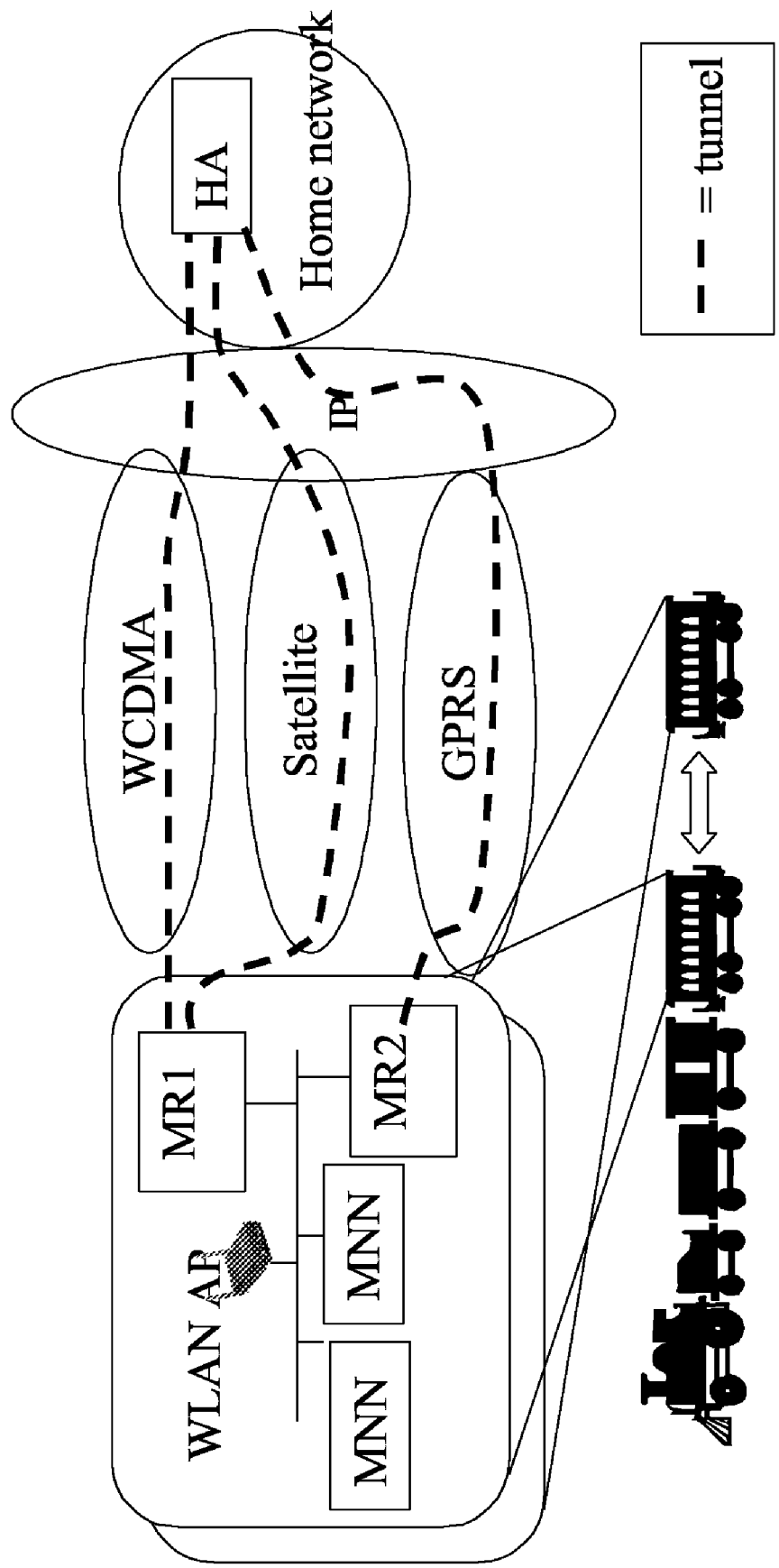

As stated above, the object of the present invention is to make it possible to maintain the network prefix consistency when the mobile network is involved in a split or a merger. That implies that a certain prefix or set of prefixes can only be used for one single network. In addition the MRs sharing the same prefix, or set of prefixes, must be connected to the same moving network in order to ensure properly functioning communication and avoid routing problems. Therefore, a local connectivity test must be available, i.e. a test for verifying if two or more MRs are located on the same link.

A triggered local connectivity test and a broadcast-based local connectivity test are examples of local connectivity tests.

To describe the triggered local connectivity test approach a scenario with two MRs, MR1 and MR2, and their mutual HA is used. The HA has already assigned prefix P to MR1, when MR2 sends a Binding Update (BU) to the HA, explicitly or implicitly requesting to be assigned prefix P. The HA should now verify that MR2 and MR1 are connected to a common link before it accepts to assign prefix P to MR2.

The proposed solution is to let the HA assign a shared secret, also called nonce in this description, to MR1, denoted $nonce_{MR1}$, when it assigns prefix P to MR1. When MR2 subsequently requests to have prefix P assigned to it, the HA requests MR2 to perform a local connectivity test towards MR1.

To initiate the local connectivity test the HA sends a second nonce, denoted $nonce_{c-test}$, to MR2. MR2 sends $nonce_{c-test}$ to MR1 in a link-local message. MR1 performs an irreversible operation, e.g. an MD5 or SHA-1 hash, on $nonce_{c-test}$ concatenated with $nonce_{MR1}$ (and possibly concatenated with a known string/bit sequence) and returns the result to MR2. MR2 forwards the result to the HA. The HA, knowing both the involved nonces, verifies the result, which indicates that MR1 and MR2 are connected to the same link. The HA then accepts to assign prefix P to MR2.

The broadcast-based local connectivity test approach builds on a relationship between a MR and its HA and on an advertisement mechanism, by which the MR can announce its presence to other MRs, thus indicating local connectivity between the MRs, in a way that can be retroactively verified by the HA.

The relationship between the MR and the HA consists of a unique secret piece of data that is mutually known by the two nodes. The secret data is either preconfigured (or derived from preconfigured data), provided to the MR by the HA, provided to the HA by the MR or mutually derived, e.g. during an authentication procedure, between the MR and the HA.

Using the secret data the MR generates advertisement information that it broadcasts or multicasts to other MRs on the same link. The advertisement information changes periodically or with each advertisement message, thereby implicitly or explicitly indicating time information.

When another MR sends a BU to the HA in order to have a prefix assigned, it includes the latest advertisement information it has received from other MRs on the link, either from all other MRs or only from the MRs using the concerned prefix.

Assuming that the MRs have a mutual HA, then for each MR the HA, aided by the shared secret data, can verify that the advertisement information included in the BU originates from the claimed MR as well as deduce its freshness. Provided that the originator of the advertisement information is indeed the claimed MR and provided that the information is fresh enough, the HA accepts it as an indication of local connectivity between the MR presenting the advertisement information and the MR that originated it. If the MR sending the BU in this way provides evidence of local connectivity towards all other MRs that were already assigned the requested prefix, the HA accepts to assign the concerned prefix to the MR.

The above described connectivity tests prevent that prefix inconsistency (in terms of the same prefix being assigned to MRs in different moving networks) arise in static configurations. However, they do not have any specific support for handling splits and mergers of moving networks.

The present invention deals with the problems associated with the dynamics of multi-MR moving networks in terms of splitting and merging moving networks and ensures that prefix consistency is maintained (or reestablished) even in the presence of such events. The simplest case of a split of a moving network is when a MR leaves the moving network, but in the general case, the result of a split may be two or more separate moving networks, each of which having one or more MR(s) and zero or more MNN(s). Similarly, the simplest case of a moving network merger is that a MR joins a moving network, but in the general case mergers take place between moving networks having one or more MR(s) and zero or more MNN(s) each. In such a dynamic situation, with moving networks potentially being split or merged at any time, (presently non-existing) mechanisms to ensure prefix consistency and functioning routing are needed. In particular it should be ensured that all MRs in a moving network share the same prefix and that MRs in different moving networks do not share the same prefix. That is, the same prefix should be consistently used by all MRs in a single moving network, but it should never be used in more than one moving network at a time.

Mechanisms to ensure prefix consistency are a main part of this invention. In addition the present invention describes mechanisms to minimize the negative impacts of prefix changes in moving networks, e.g. on the MNNs. The inventive solution has no impact on the MNNs in terms of new requirements on functions or behavior. This is an important and advantageous property of the invention to avoid backwards compatibility problems and other deployment problems, since potential MNNs are numerous and hard to control in terms of implemented software, whereas MRs are few and assumedly under administrative control.

The NEMO Basic Support protocol has no explicit support for multiple MRs. Neither does it have any specific support for dynamic moving networks in terms of splits and mergers.

The means for performing local connectivity tests described above can be used to verify that a MR that is to be assigned a certain prefix is connected to the same moving network as the other MRs (if any) that are already assigned the same prefix. However, they do not have any specific support for handling splits and mergers of moving networks. It is however assumed that the above described mechanisms for performing a local connectivity test are available for the present invention.

Further assumptions are that all involved MRs use the same HA, network prefix consistency is required, and the same prefix used by all MRs in a single moving network. Yet further assumptions are that dynamic prefix assignment through a Binding Update (BU)/Binding Acknowledgement (BA) exchange is possible and that when two separate moving networks, both having external connectivity, use the same prefix, at least one of them must change the prefix. The MR may indicate a preferred prefix in the BU, the HA assigns the prefix in the BA. However, although the mechanisms for dynamic prefix assignment described in conjunction with the local connectivity test are assumed, other mechanisms for dynamic prefix assignment with similar properties may also be used.

No new requirements on MNNs in terms of functions or behavior is another assumption.

Figure 4:
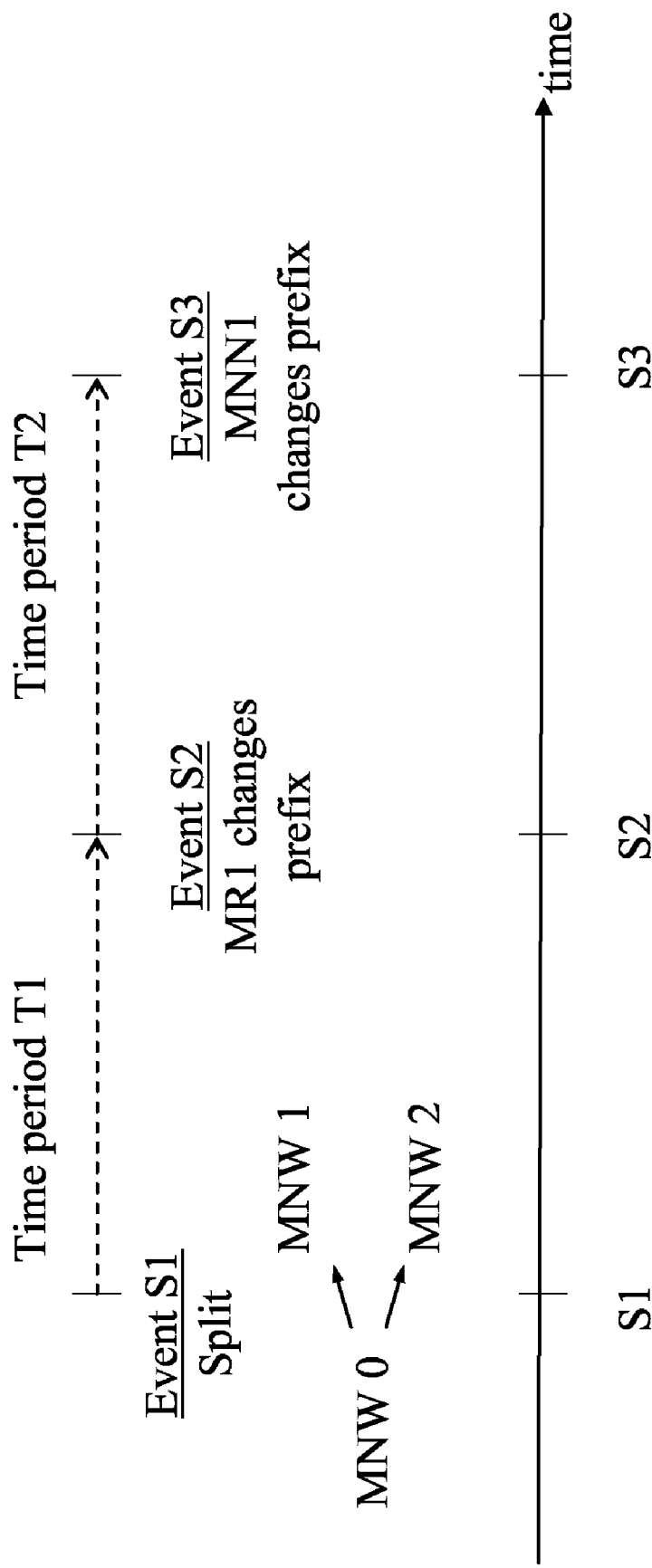
FIG. 4 shows a timeline illustrating the consequences of a split of a moving network according to the present invention.

FIG. 4 shows a timeline illustrating examples of consequences of a split of a moving network and the desired reactions according to the present invention. Both MR1 and MR2 are assumed to have external connectivity. "MNW" stands for "moving network". Events S1, S2 and S3 are indicated on the timeline and a time period denoted T1, is the time period between events S1 and S2 and a time period denoted T2, is the time period between events S2 and S3. At event S1 a MNW 0 is split into MNW 1 and MNW 2. At event S2, MR1 changes prefix and at event S3 MNN1 changes prefix and stops using the old prefix.

Before event S1:
Moving Network 0:
MR1: prefix A
MR2: prefix A
MNN1: prefix A
MNN2: prefix A
Conditions for MNN1:
Full connectivity through MR1 and MR2 and to MNN2 using prefix A.
Conditions for MNN2:
Full connectivity through MR1 and MR2 and to MNN1 using prefix A.
After Event S1:
Moving network 1:
MR1: prefix A
MNN1: prefix A
Moving Network 2:
MR2: prefix A
MNN2: prefix A Conditions for MNN1:
 Old sessions through MR2 are interrupted and moved to MR1 (at least the outgoing direction).
 Old sessions through MR1 (in both directions) are intact.
 Session establishment through MR2 fails.
 Session establishment through MR1 (in both directions) succeeds.
 Old sessions to MNN2 are broken.
 Session establishment to MNN2 fails.
Conditions for MNN2:
 The conditions for MNN2 are the same as for MNN1. The only difference is that MR2 instead of MR1 is the remaining MR.

At event S1 the original moving network (MNW 0) is split into two separate moving networks (MNW 1 and MNW 2) with no local connectivity between each other. It is however assumed that both MR1 and MR2 have external connectivity both before and after the split. (External connectivity implies the possibility to communicate outside the own network.) The consequences of the split are described from the points of view of MNN1 and MNN2.

The ongoing sessions (e.g. TCP connections) through MR1 are initially not affected, provided that the HA consistently forwards the downlink (i.e. HA-to-MR direction) data streams of the sessions to MR1. Such consistent choice of MR can be ensured through various flow management mechanisms, but are not always used. The same goes for establishment of new sessions through MR1. An example of a flow mechanism is disclosed in WO2006/046896.

Ongoing sessions through MR2 are interrupted due to loss of local connectivity to MR2. Establishment of new sessions through MR2 fails. However, if MNN1 uses the Neighbor Unreachability Detection (NUD) mechanism of IPv6, it will typically detect the loss of contact with MR2 within around 20 seconds for ongoing sessions and within around 5 seconds during attempts to establish new sessions. MNN1 may then, after performing the Next-hop-determination procedure, switch to using MR1 for ongoing and new sessions. After switching to MR1 bidirectional sessions could be maintained, provided that the HA forwards the downlink flows via MR1. If the HA forwards downlink traffic via MR2 both ongoing sessions and new sessions will fail.

Ongoing sessions using the local connectivity between what is now MNW 1 and MNW 2, e.g. sessions to MNN2, are broken and establishment of new session fails, due to loss of local connectivity and no external routing in place.

The consequences of event S1 are the same for MNN2 as for MNN1 (although from MNN2's perspective MR1 is the lost MR and MR2 is the remaining one).

After event S2:
Moving Network 1:
MR1: prefix B
MNN1: prefixes A, B
Moving Network 2:
MR2: prefix A
MNN2: prefix A
Conditions for MNN1:
 (Old sessions through MR2 have assumedly been moved to MR1.)
 Old sessions through MR1 are broken.
 Session establishment through MR2 fails.
 Session establishment through MR1 fails if prefix A is used.
 Session establishment through MR1 succeeds if prefix B is used.
 (Old sessions to MNN2 are still broken.)
 Session establishment to MNN2 fails if prefix A is used.
 Session establishment to MNN2 succeeds if prefix B is used.
Conditions for MNN2:
 The HA successfully forwards all downlink flows to MNN2 via MR2, thus providing full connectivity through MR2 (MNN1 reached through MR2).

At event S2 MR1 switches to a new prefix to resolve the situation and enable functioning routing. To make this happen the inventive solution provides mechanisms for detection of loss of local connectivity between MRs and resulting prefix change(s).

When MR1 has changed from the old prefix (A) to a new prefix (B), functioning external routing is enabled, but there are initial consequences for the MNN(s) of MR1, i.e. MNN1.

Ongoing sessions through MR1 are broken. In the downlink direction the HA will no longer forward the data streams to MR1 (due to the changed prefix). In the uplink (MR-to-HA) direction the data streams may be blocked by ingress filtering (in MR1, the HA or a router in the network of the HA). Establishment of new sessions through MR1 using the old prefix fails for the same reasons. However, MNN1 will detect that MR1 advertises a new prefix. It may then start using the new prefix in addition to the old prefix and may thus successfully establish new sessions through MR1 using the new prefix (this is subject to the source address selection mechanisms in MNN1).

MNN2 is indirectly affected by event S2, since MR2 is now the only MR that supports prefix A. Hence, the HA has no choice but to forward all downlink flows to MNN2 via MR2. This means that MNN2 has full connectivity through MR2, even without flow management mechanisms in the HA.

After event S3:
Moving Network 1:
MR1: prefix B
MNN1: prefix B
Moving network 2:
MR2: prefix A
MNN2: prefix A
Conditions for MNN1:
 Full connectivity through MR1 using prefix B (MNN2 reached through MR1).
 MR2 eventually times out as a default router.
Conditions for MNN2:
 Full connectivity through MR2 (MNN1 reached through MR2 if prefix B is used in the destination address).
 MR1 eventually times out as a default router.

At event S3 MNN1 stops using the old prefix and the situation is normalized. To make this happen MNN1 uses mechanisms to detect that MR1 uses a new prefix and that the old prefix is no longer valid. Eventually, when MR2's lifetime as an advertised default router expires, the last remaining sign of the split disappears in moving network 1.

The only (indirect) impact that event S3 has on MNN2 is that MNN1 can no longer be reached using prefix A in the destination address. Eventually, when MR1's lifetime as an advertised default router expires, the last remaining sign of the split disappears in moving network 2.

In order to minimize the negative consequences of the moving network split the time periods between event S1 and event S2 (T1) and between event S2 and event S3 (T2) should be minimized. Thus the mechanisms enabling event S2 and event S3 should be as swift as possible. On the other hand, minimizing the negative consequences for the MNNs also means that as few sessions as possible should be broken. Ongoing sessions are broken when the prefix they use is invalidated. Thus, compromise solutions taking ongoing sessions into account should be considered when dealing with time period T2. Solutions how to minimize T2 and T3 are described below.

Figure 5:
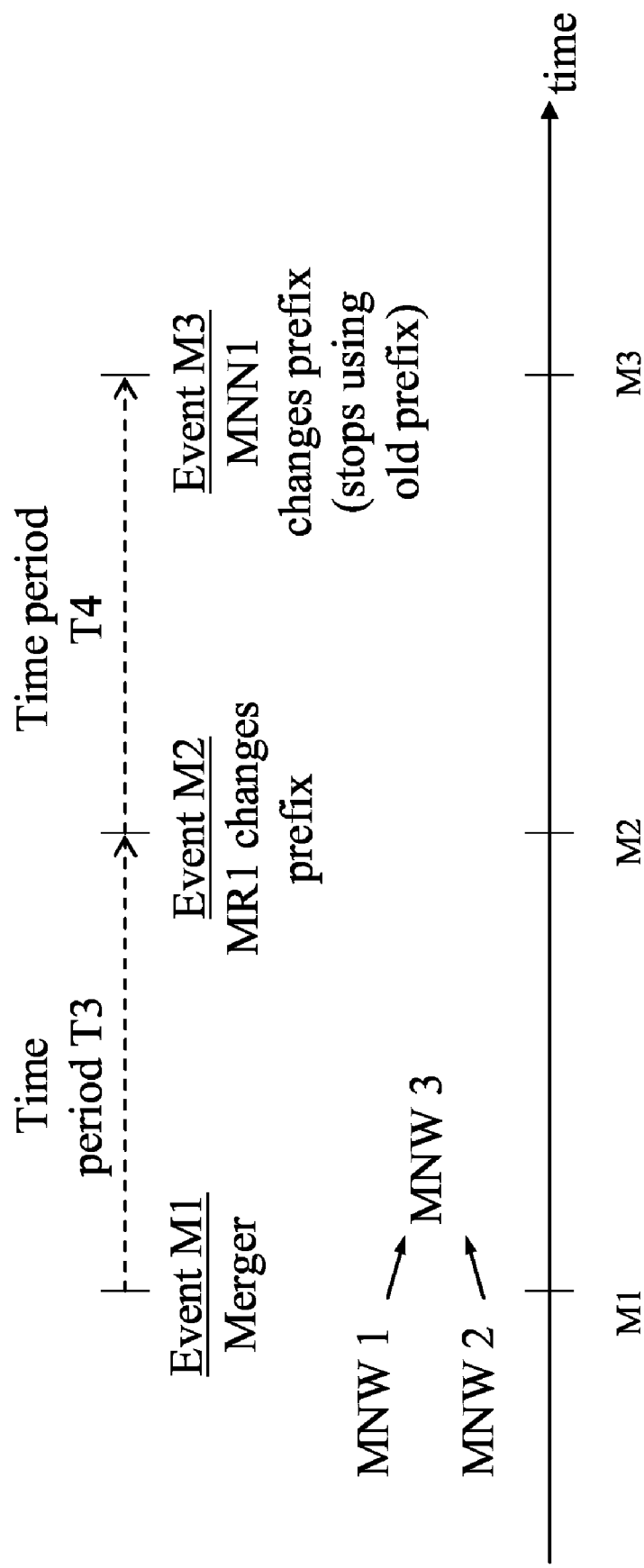
FIG. 5 shows a timeline illustrating the consequences of a merger of a moving network according to the present invention.

FIG. 5 shows a timeline illustrating the consequences of a merger of a moving network and the desired reactions according to the present invention. Both MR1 and MR2 are assumed to have external connectivity. "MNW" stands for "moving network". Events M1, M2 and M3 are indicated on the timeline and a time period denoted T3, is the time period between events M1 and M2 and a time period denoted T4, is the time period between events M2 and M3. At event M1 a MNW 1 and MNW 2 are merged into MNW 3. At event M2, MR1 changes prefix and at event M3 MNN1 changes prefix and stops using the old prefix.

Before M1:
Moving Network 1:
MR1: prefix A
MNN1: prefix A
Moving Network 2:
MR2: prefix B
MNN2: prefix B
Conditions for MNN1:
   Full connectivity through MR1 using prefix A.
Conditions for MNN2:
   Full connectivity through MR2 using prefix B.
   After event M1:
Moving Network 3:
MR1: prefix A
MR2: prefix B
MNN1: prefixes A, (B)
MNN2: prefixes (A), B
Conditions for MNN1:
   Old sessions through MR1 are intact.
   Session establishment through MR1 succeeds if prefix A is used.
   Session establishment through MR2 succeeds if prefix B is used.
   Session establishment through MR1 fails if prefix B is used.
   Session establishment through MR2 fails if prefix A is used.
   Session establishment to MNN2 succeeds using prefix A or B.
Conditions for MNN2:
   The conditions for MNN2 are the same as for MNN1. The only difference is that MR1 and prefix A are the new MR and prefix instead of MR2 and prefix B.

At event M1 the two original moving networks (MNW 1 and MNW 2) are merged into a single moving network (MNW 3). Both MR1 and MR2 are assumed to have external connectivity both before and after the merger. The consequences of the merger are described from the points of view of MNN1 and MNN2.

Initially (until the MRs detect the merger, select prefix and possibly change prefix) both MRs keep using their old respective prefixes (A and B). Hence MNN1's ongoing sessions through MR1 are initially unaffected.

If MR2 sends a router advertisement during the time period between event M1 and event M2 (i.e. during time period T3), then MNN1 will receive this router advertisement and add prefix B to its already existing prefix A. If this happens, MNN1 will be able to establish new sessions through MR2 using prefix B as well as new sessions through MR1 using prefix A. However, it cannot be assumed that the source address selection in MNN1 is coordinated with the default gateway selection. Therefore the session establishment attempts may as well fail (due to ingress filtering), if MNN1 tries to establish a session through MR2 using prefix A or through MR1 using prefix B.

If MNN1 does not receive a router advertisement from MR2, it keeps using only prefix A and will thus be able to establish new sessions through MR1, whereas session establishment attempts through MR2 will fail.

There is now local connectivity between the two parts of MNW 3 that used to be MNW 1 and MNW 2 respectively. Hence, provided that MNN1 and MNN2 have at least one prefix in common (i.e. provided that either MR1 or MR2 advertises its prefix during the time period between event S1 and event S2) session establishment between MNN1 and MNN2 using a common prefix will succeed using local connectivity. Using a prefix that the two MNNs do not have in common session establishment may still succeed through external routing.

The consequences for MNN2 are the same as for MNN1 (although from MNN2's perspective MR1 and prefix A are the new MR and prefix and MR2 and prefix B are the old ones).

After event M2:
Moving Network 3:
MR1: prefix B
MR2: prefix B
MNN1: prefixes A, B
MNN2: prefixes (A), B
Conditions for MNN1:
   Old sessions through MR1 are broken.
   Old sessions through MR2 are intact.
   Session establishment through MR1 or MR2 succeeds if prefix B is used.
   Session establishment through MR1 or MR2 fails if prefix A is used.
   Old sessions to MNN2 are intact.
   Session establishment to MNN2 succeeds using prefix B and possibly using prefix A.
Conditions for MNN2:
   The conditions for MNN2 are more or less the same as for MNN1. Minor differences:
   MNN2 is less likely to use prefix A and fail.
   Session establishment to MNN1 succeeds using prefix A or B.

At event M2 MR1 changes its prefix from prefix A to prefix B in order to provide consistent prefix advertising among the MRs in the moving network and thereby avoid the above described problems. To make this happen the inventive solution provides mechanisms for detection of new MRs (with new prefixes) and resulting prefix selection and prefix change(s).

When MR1 has changed to prefix B, prefix consistency within the moving network MNW 3 is established. However, there are initial consequences for the MNNs.

Ongoing sessions through MR1 will be broken, in the uplink direction because of ingress filtering and in the downlink direction because the HA will not forward packets with the old prefix (prefix A) to MR1 anymore.

If MR1 had time to advertise prefix A in the merged moving network, MNW 3, before changing to prefix B, then there is a small, but non-zero, probability that MNN2 has used prefix A to establish a session through MR1. In such case MNN2's ongoing sessions through MR1 are broken.

Ongoing sessions through MR2 are unaffected as well as ongoing sessions between MNN1 and MNN2 using local connectivity.

MNN1 will detect that MR1 is using a new prefix. Thus, new sessions can be established through either MR1 or MR2 using prefix B, but not using prefix A. New sessions can be established between MNN1 and MNN2 using local connectivity, if a common prefix is used. MNN1 and MNN2 now have at least prefix B in common, but if MR1 had time to advertise prefix A in the merged moving network (MNW 3) before changing to prefix B, then MNN1 and MNN2 will also have prefix A in common until it times out.

After event M3:
Moving Network 3:
MR1: prefix B
MR2: prefix B
MNN1: prefix B
MNN2: prefix B
Conditions for MNN1:
  Full connectivity through MR1 and MR2 and to MNN2 using prefix B.
Conditions for MNN2:
  Full connectivity through MR1 and MR2 and to MNN1 using prefix B.

At event M3 MNN1 (and MNN2 if applicable) stops using the prefix A and the situation is normalized. To make this happen MNN1 uses mechanisms to detect that MR1 uses a new prefix and that the old prefix is no longer valid.

In order to minimize the negative consequences of the moving network split the time periods between event M1 and event M2 (T3) and between event M2 and event M3 (T4) should be minimized. Thus the mechanisms enabling event M2 and event M3 should be as swift as possible. On the other hand, minimizing the negative consequences for the MNNs also means that as few sessions as possible should be broken. Ongoing sessions are broken when the prefix they use is invalidated. Thus, compromise solutions taking ongoing sessions into account should be considered when dealing with time period T4. Solutions how to minimize T3 and T4 are described below.

As described above, it is desired to maintain prefix connectivity in dynamic (splitting and merging) moving networks and reducing the negative consequences of splits and mergers.

Figure 6B:
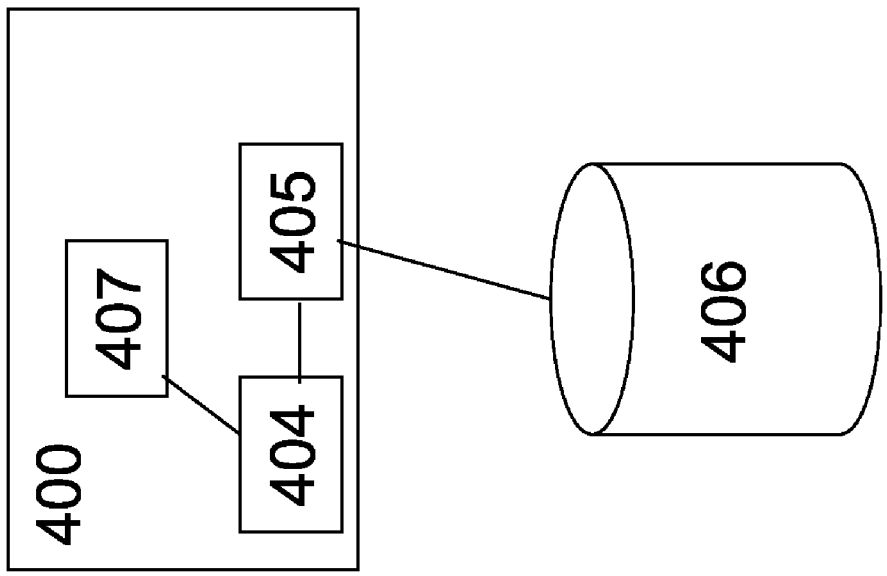
FIGS. 6a and 6b illustrates schematically the mobile routers according to the present invention.
Figure 6A:
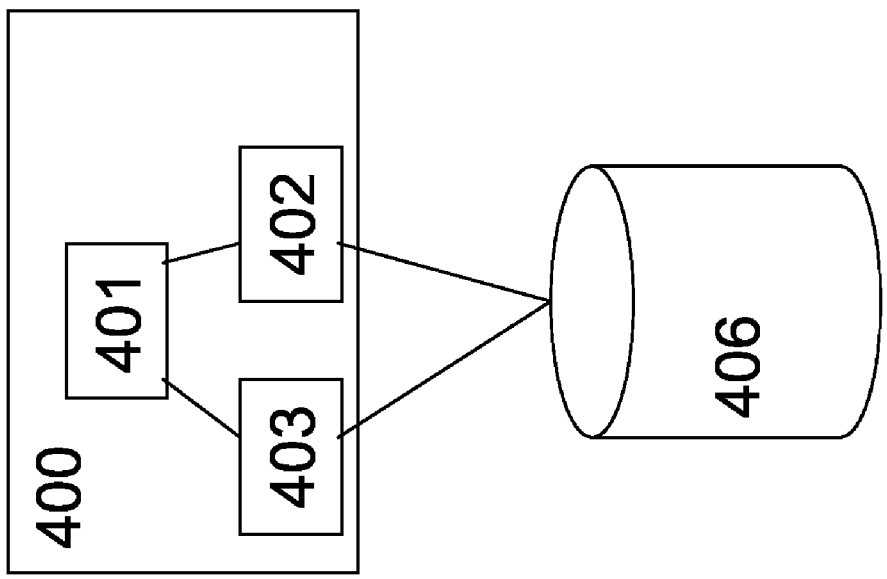

That is according to a first aspect achieved by a first MR 400 as illustrated in FIG. 6a. The first MR 400 is connectable to a first moving network associated to a home agent 406. The first moving network comprises at least a second MR, wherein each of the MRs has a relation with said HA 406 and is assigned a first network prefix identifying the first moving network. The first MR according to the present invention comprises means 401 for determining that the first moving network is split into a second and a third moving network such that the first MR belongs to the second moving network, means 402 for transmitting a request to said HA 406 to be re-assigned the first network prefix, and means 403 for being re-assigned the first network prefix if local connectivity between the first MR and all other MRs that are assigned the first network prefix can be verified.

According to a second aspect of the present invention, that is achieved by a first mobile router, MR, 400 as illustrated in FIG. 6b. The first MR 400 is connectable to a first moving network associated to a home agent 406 and assigned a first set of network prefixes identifying the first moving network. The first MR 400 comprises means 403 for determining that the first moving network is merged with a second moving network into a third moving network, the second moving network comprises at least a second MR, wherein each of the at least second MR has a relation with said HA and is assigned a second set of network prefixes identifying the second moving network, means 404 for comparing, between the first and second moving networks, a predetermined characteristic indicative of the consequence of a prefix change of the moving network, and means 405 for transmitting a request to said HA to be assigned the second set of network prefixes based on a result of said comparison.

It should be noted that a single MR may comprise means 401, 402, 403 for handling a split and means 404, 405, 407 for handling a merger.

In order to detect a merge or a split the MRs are required to be able to keep track of each other. Each MR should continuously track the presence or absence of other MRs in its moving network. Such tracking is enabled if the MRs periodically advertise their presence and the prefix(es) they are using and continuously listen for such advertisements. In addition to the periodical advertising, if a MR is assigned a new prefix, it should advertise the new prefix immediately irrespective of the regular advertisement cycle.

The proposed mechanisms for this differ in regular moving networks and moving networks in which all MRs cannot hear each other directly (e.g. in a layer 1/layer 2 medium in which all nodes cannot hear each other directly, e.g. in a wireless medium where some nodes may be out of each other's radio range). The basic functionality is the same, but additional mechanisms are added in the latter case in order to cope with the special properties of such moving networks.

MR Tracking in Regular Moving Networks

The simplest method is to utilize the existing router advertisement feature of IPv6, by which routers advertise their presence and the prefix(es) they support.

The IPv6 router advertisement message is implemented using the neighbor discovery (ND) feature (further described in RFC 2461). There is a corresponding router advertisement feature for IPv4, although rarely used, based on ICMPv4 (further described in RFC 1256).

Another possibility is to define a new protocol (including only a single message type—MR advertisement, i.e. a dedicated advertisement message) using periodic (possibly with the periods uniformly randomized between a minimum and a maximum value (like IPv6 router advertisements)), unacknowledged multicast messages (preferably addressed to an "all MR multicast group") advertising the presence of a MR and the prefix(es) it supports. Like IPv6 router advertisement messages, these multicast MR advertisement messages should be sent with the link-local address as the source address. In addition to the MR advertisement information the dedicated MR advertisement message should contain a "solicitation flag". A MR receiving a MR advertisement message with the solicitation flag set should immediately (or after a random delay) send a MR advertisement message. (Optionally, a similar solicitation flag could be associated with the MR advertisement information also if IPv6 router advertisements are used. In such case, upon reception of a router advertisement message with the solicitation flag set a MR should react as if having received a router solicitation message (described in RFC 2461), i.e. it should send a router advertisement message after a random delay. However, using the regular router solicitation messages to solicit router advertisements is probably a better option than introducing a solicitation flag in the router advertisements.)

In addition to the prefix(es) and the MR link-local address, the MR advertisement information could potentially include various other parameters, e.g. to aid the handling of prefix selection after moving network splits or mergers. If IPv6 router advertisements are used, such additional parameters would have be placed in new, backwards compatible options.

It should be noted that in this application, the term MR advertisement message can imply both an IPv6 router advertisement or a new message according to the new defined protocol as described above.

Yet a possibility for MRs that have already detected each other is to use pair-wise reachability tests in the form of periodic probe-response message exchanges on the local link, e.g. ICMPv6 Echo Request/Reply (described in RFC 2463)) (or ICMPv4 Echo/Echo Reply) or Neighbor Solicitation/Neighbor Advertisement, RFC 2461 (or ARP Request/Response RFC 826). Such pair-wise testing is not as generically applicable as periodic advertising.

Nevertheless it is a possibility that may be mentioned for comprehensiveness, particularly in view of the local connectivity test described above, which is utilized by the present invention. Yet a possibility is that the MRs use a routing protocol, e.g. OSPF within the moving network.

The two periodic advertisement methods, using regular router advertisements or specific multicast messages, are collectively referred to as "MR tracking method 1" or the "direct MR tracking method".

MR Tracking in Moving Networks in which all MRs Cannot Hear Each Other Directly

An alternative to the direct MR tracking method takes into account the potential property of moving networks that are based on certain layer 1 and layer 2 media types, e.g. wireless ad-hoc networks, that all nodes in the layer 2 network cannot necessarily hear each other directly, e.g. because they are out of each other's radio range.

In this alternative MR tracking method each MR periodically advertises not only its own prefix(es), but also replicates the advertised information that it receives from the other MRs. The replicated information includes the (link-local) address of the MR that was the source of the information in addition to the advertised information. The result is that the (link-local) address and supported prefix(es) of all MRs in the moving network will be distributed to all MRs throughout the moving network, even if all MRs cannot hear each other.

An MR can perform the replication either by simply re-sending any valid MR advertisement that it hears or by including in its own regular MR advertisement, the latest valid MR advertisement information that it has received from other MRs. In any case it is important that the (link-local) address of the MR that is the original source of a piece of replicated information is included in the replicated information, so that a receiver can unambiguously associate the (link-local) MR address with the prefix(es) that each MR supports.

"Valid MR advertisement" refers to MR advertisements that the MR has not replicated before.

"The latest valid MR advertisement information" refers to the latest MR advertisement information concerning a certain source MR that is not older than one advertisement period (measured from when the MR received the information) and that the MR has not replicated before. That is, if the MR received the latest MR advertisement information concerning a certain source MR more than one advertisement period ago, this advertisement information should not be replicated in the MR's own MR advertisement. Nor should the MR replicate MR advertisement information that it has already replicated, regardless of its age. How a MR can avoid replicating MR advertisements or MR advertisement information that the MR has already replicated is described below.

In order to avoid loops of replicated information, each advertised piece of information, conceptually consisting of the (link-local) MR address and information about the prefixes the MR supports, should have an associated sequence number. Together with the (link-local) MR address the sequence number makes the piece of information unique within a time period that preferably should be far larger than the advertisement period. Through temporary caching of the unique identifier consisting of the combination of (link-local) MR address and sequence number, a MR should make sure not to replicate any piece of information that it has recently already replicated.

In this alternative MR tracking method it is preferred to use dedicated MR advertisement messages. It is however still possible to use IPv6 router advertisements. In such case a replicating MR should not simply resend a received router advertisement. Instead it should use the option of including in its own regular MR advertisement, the latest valid MR advertisement information that it has received from other MRs. The information described above that is not part of the regular router advertisement format (as defined in RFC 2461) should be placed in new options in the router advertisement. In addition, in this alternative MR tracking method, it is preferred to associate a solicitation flag with the MR advertisement information.

This MR tracking method is referred to as "MR tracking method 2" or the "indirect MR tracking method". The indirect MR tracking method works in any type of moving network, including those where the layer 1 and layer 2 media do not allow all MRs to hear each other directly, but a disadvantage is that it may not scale very well in very large moving networks.

Mechanism for Change of Prefix

The assumed mechanism for changing a prefix is a dynamic prefix assignment through a BU/BA (Binding Update/Binding Acknowledge) exchange, which allows the MR to indicate the prefix it prefers and in which the prefix assignment is subject to the successful outcome of a local connectivity test towards the other MRs (if any) that are already using the prefix to be assigned. However, other mechanisms for dynamic prefix assignment with similar properties may also be used.

In moving networks where the layer 1 and layer 2 media do not allow all MRs to hear each other directly the broadcast-based local connectivity test described above is assumed, because the triggered local connectivity test described above does not work in such moving networks.

When the broadcast-based local connectivity test is used, the advertisement messages used for this local connectivity test should preferably be combined/integrated with the messages used for MR advertisement.

Split Detection

There is actually no real need for a specific mechanism for detecting when a moving network splits, because the mechanisms for selection and change of prefix implicitly/inherently detects and handles splits. Nevertheless, to facilitate the understanding of the inventive solution the principles for split detection are described below.

When a MR detects that it has lost connectivity to another MR in the moving network, it determines/assumes that the moving network has been split. The principles for such split/loss of connectivity detection differs in regular moving networks (in which the "direct MR tracking method" is used) and moving networks in which all MRs cannot hear each other directly (in which the "indirect MR tracking method" is used).

The following split detection principle is used in regular moving networks:

If a MR can no longer hear the MR advertisement messages (be it router advertisements or dedicated multicast messages) of a certain other MR, it determines/assumes that the moving network has been split. The concerned MR advertisement messages must have been missing for a certain (fixed or configurable) number of consecutive advertisement periods before the MR determines that it "can no longer hear" the other MR. In addition, the MR determines that it "can no longer hear" the other MR, if no MR advertisement messages have been received from the other MR within a certain "reasonable" (possibly configurable) time period following sending or receiving a certain (fixed or configurable) number of solicitations for MR advertisement information.

The following split detection principle is used in moving networks in which all MRs cannot hear each other directly:

If a MR no longer receives the MR advertisement information of a certain originating MR (neither through the advertisement message sent by the originating MR itself or through replication in other MRs), it determines/assumes that the moving network has been split. The concerned MR advertisement information must have been missing for a certain (fixed or configurable) number of consecutive advertisement periods before the MR determines that it "no longer receives the MR advertisement information" of the concerned originating MR. In addition, the MR determines that it "no longer receives the MR advertisement information" of the concerned originating MR, if no such MR advertisement information has been received within a certain "reasonable" (possibly configurable) time period following sending or receiving a certain (fixed or configurable) number of solicitations for MR advertisement information It should be mentioned that this split detection principle (in all types of moving network) may sometimes erroneously determine/assumes a split, even though it may simply be that one of the MRs has stopped acting as a MR (e.g. because it is malfunctioning or turned off or has become a pure MNN).

In addition, a preferable complementing principle is that if a MR detects signs of another MR detecting a split (or possibly a merger), e.g. that another MR changes its prefix, the MR may assume that a split (or possibly a merger) has occurred and may take actions accordingly. This is described further below.

Alternatives, or complements, to the above include detecting loss of connectivity to another MR through the aliveness monitoring mechanism of a routing protocol, e.g. the Hello Packets of OSPF (described in RFC 2328 and RFC 2740), or using the probe-response message exchanges (e.g. ICMPv6 Echo Request/Reply [described in RFC 2463] (or ICMPv4 Echo/Echo Reply, described in RFC 792) or Neighbor Solicitation/Neighbor Advertisement (RFC 2461) (or ARP Request/Response RFC 826). It is also possible that the Neighbor Unreachability Detection mechanism of a MR detects loss of connectivity to another MR. Yet a possibility is to detect loss of connectivity through link-layer mechanisms, e.g. loss of Bluetooth or IEEE 802.11 connections/associations, notified through a layer 2 triggering API.

In general, a MR should interpret any indication of loss of connectivity to another MR, be it from any of the above mentioned means, as an indication of a moving network split (in the case of another MR changing its prefix it may be an indication of either a split or a merger) and should react accordingly.

Merger Detection

There is actually no real need for a specific mechanism for detecting when two moving networks merge, because the mechanisms for selection and change of prefix implicitly/inherently detects and handles mergers. Nevertheless, to facilitate the understanding of the inventive solution the principle for merger detection is described below.

The following merger detection principle is used in all kinds of moving networks:

If a MR hears the MR advertisement information of a new MR (either directly, in any kind of moving network, or replicated, in moving networks in which all MRs cannot hear each other directly) announcing another prefix than the MRs own prefix, it determines/assumes that the moving network has been merged with another moving network.

In addition, a preferable complementing principle is that if a MR detects signs of another MR detecting a merger (or possibly a split), e.g. that another MR changes its prefix, the MR may assume that a merger (or possibly a split) has occurred and may take actions accordingly.

A MR may also be aided by a routing protocol (e.g. OSPF) in discovering new MRs announcing other prefixes.

Selection and Change of Prefix after a Split or a Merger

When a moving network has been split, all but one of the resulting moving networks have to change from the old to a new prefix in order to maintain the required prefix and routing consistency. Thus, the MR according to the present invention comprises means for determining that the first moving network is split into a second and a third moving network such that the first MR belongs to the second moving network, means for transmitting a request to the associated HA to be re-assigned the first set of network prefixes, and means for being re-assigned the first set of network prefixes if local connectivity between the first MR and all other MRs that have been assigned the first set of network prefixes can be verified.

Similarly, when two or more moving networks merge, all but one of the merging moving networks must change their prefixes, so that prefix consistency results. The MR according to the present invention comprises means for determining that the first moving network is merged with a second moving network into a third moving network, the second moving network comprises at least a second MR, wherein each of the at least second MR has a relation with a HA and is assigned a second set of network prefixes identifying the second moving network, means for comparing, between the first and second moving networks, a predetermined characteristic indicative of the consequence of a prefix change of the moving network, and means for transmitting a request to said HA to be assigned the second set of network prefixes based on a result of said comparison.

As described above a change of prefix inevitably has negative effects on the nodes in the moving network. Therefore, in order to minimize these negative effects, it is desirable that the prefix change affects as few nodes as possible.

As a consequence, when a moving network splits, it is desirable that the largest, in terms of the number of nodes, of the moving networks resulting from the split is the one that gets to keep the old prefix. Therefore, according to a preferred embodiment, a mechanism is used that ensures that a MR of the second moving network is re-assigned the first set of prefixes only if the second moving network comprises a higher number of nodes than the third moving network.

Similarly, when moving networks merge, the predetermined characteristic is according to an embodiment the number of nodes of the networks and the moving network having the greatest number of nodes of the merging moving networks is the one that gets to keep the old prefix.

A simplified way of assessing the size of a moving network is to assume that the number of MRs in the moving network is an unambiguous indication of its relative size. This simplification allows a MR to leverage the MR tracking mechanism to estimate the relative size of the moving network.

A more accurate, but also more complex (and possibly more time consuming) way of assessing the size of the moving network is to consider all the nodes, MRs as well as MNNs, in the moving network.

A more advanced alternative is to not consider the actual size of the moving network, but to rather estimate a "value" of the moving network. This "value" would be a measure of the consequences of changing prefix: the greater consequences of the prefix change, the greater "value".

In this section regular moving networks and moving networks in which all MRs cannot hear each other are treated together. Thus, the concept of "receiving originating MR advertisement information from another MR" refers to either receiving the information directly from the MR originating the information or receiving the information replicated by yet another MR. The replicating MR is not important in this context—it is the MR originating the MR advertisement information that is important. It should also be noted that the MR advertisement information may be included in either IPv6 router advertisement messages or dedicated advertisement messages.

Three principles are used for selection and change of prefix according to different embodiments. The three principles complement each other and should preferably be used in parallel. The first principle targets split events, the second one targets merger events and the third one complements the two first and improves the performance. The actions stipulated by the principles could be seen as default actions, that could be overridden by configuration, e.g. if an administrator of a group of MRs prefers a different behavior.

Three prefix selection principles 1, 2 and 3 are presented below, followed by a number of alternative variants of principles 1 and 2. The alternatives should not be seen as options for each individual implementer or MR to choose from. The assumption is that all interacting MRs use the same alternative of the principles.

In prefix selection principle 1 the number of MRs in a moving network is used as an indication of the size of the moving network. The MR tracking mechanisms described above are used to determine the number of MRs in a moving network.

Prefix Selection Principle 1

When a MR detects a moving network split (i.e. detects loss of connectivity to another MR), it should:

Send MR advertisement information and solicit MR advertisement information from other MRs. That is, if router advertisements messages are used to advertise MR advertisement information, then a router advertisement message and a router solicitation message are sent. (If the option of introducing a solicitation flag associated with the MR advertisement information is used in router advertisements, as described further below, then this flag should be set in the router advertisement and the router solicitation message can be omitted.) If dedicated MR advertisement messages are used, a MR advertisement message with the solicitation flag set is sent (the solicitation flag is described further below). In either case the MR advertisement information is sent irrespective of the time that is left of the current regular MR advertisement period. This is to quickly get a correct view of which MRs that are still present in the moving network after the split and to facilitate (and speed up) for other MRs to get a similar correct view. Optionally, the MR could send a short series of messages, both advertising and soliciting MR advertisement information, especially if the L1/L2 medium of the moving network is considered unreliable.

Wait one MR advertisement period (if the MR advertisement periods are randomized within a minimum and a maximum value, the maximum value should be assumed) or, if this occurs first, until originating MR advertisement information has been received from all other MRs that the MR was previously aware of, except the one whose loss of connectivity triggered the split detection. This is to ensure that the MR has a correct perception of the number of MRs in its moving network after the split. If the L1/L2 medium of the moving network is considered fairly reliable, it may be assumed that the solicitation for MR advertisement reached all remaining MRs in the moving network and then the waiting time can be set to a smaller value than one MR advertisement period. A possible option could be that if the MR after this step determines that the moving network that the MR belongs to after the split, still holds more than half of the MRs of the original moving network, then the MR assumes that its moving network will be the one to keep the old prefix and thus exits the procedure (i.e. skips the remaining steps). (Using this option, however, introduces a small risk of resulting inconsistencies, since a MR never can be completely sure that its perception of the number of present MRs is correct. For instance, another MR that the MR had not yet detected may have joined the moving network right before the split.)

Wait an additional time $t=n\times p+d$, where n is the number of other MRs that the MR still receives originating MR advertisement information from, p is a certain predefined time period, and d is a random delay $0 \leq d < p$. (The purpose of the random time period, d, is to avoid collisions when several MRs potentially try to request prefix reassignment more or less at the same time. However, a possible alternative is to skip this random time period, i.e. to set d=0, in order not to waste more time than necessary. A further rationale for this alternative would be that the MRs are not likely to be very many and their split detections may not be perfectly synchronized anyway.)

Send a BU to the HA requesting to be reassigned the same prefix. (The HA will apply any of the above mentioned local connectivity tests and reassign the same prefix if the test succeeds, but assign another prefix, or possibly simply reject the BU, if the test fails.)

If the HA assigns a new prefix, send MR advertisement information, irrespective of the time that is left of the current regular MR advertisement period. This is to facilitate and speed up convergence to a new prefix after a prefix change in a moving network.

This prefix selection principle targets moving network splits. It will allow the largest (defined by the number of MRs) of the moving networks resulting from a split of a moving network to keep the old prefix.

Prefix Selection Principle 2

When a MR detects a moving network merger (i.e. detects a new MR announcing another prefix than the MR's own prefix), it should according to an embodiment referred to as prefix selection principle 2:

Send MR advertisement information and solicit MR advertisement information from other MRs. That is, if router advertisements messages are used to advertise MR advertisement information, then a router advertisement message and a router solicitation message are sent. (If the option of introducing a solicitation flag associated with the MR advertisement information is used in router advertisements, as described further below, then this flag should be set in the router advertisement and the router solicitation message can be omitted.) If dedicated MR advertisement messages are used, a MR advertisement message with the solicitation flag set is sent (the solicitation flag is described further below). In either case the MR advertisement information is sent irrespective of the time that is left of the current regular MR advertisement period. This is to quickly get a correct view of which MRs that are present in the merged moving network and what prefix(es) they use and to facilitate (and speed up) for other MRs to get a similar correct view. Optionally, the MR could send a short series of messages, both advertising and soliciting MR advertisement information, especially if the L1/L2 medium of the moving network is considered unreliable.

Then, the MR should preferably wait one MR advertisement period (if the MR advertisement periods are randomized within a minimum and a maximum value, the maximum value should be assumed). This is to ensure that the MR has detected all new MRs in the merged moving network, before determining whether to change prefix or not. If the L1/L2 medium of the moving network is considered fairly reliable, it may be assumed that the solicitation for MR advertisement reached all the MRs in the merged moving network and then the waiting time can be set to a smaller value than one MR advertisement period.

Then the following logic should be executed using the following notation:

| Notation: | |
|---|---|
| $N_{own}$ | The number of MRs that the MR is aware of announcing the MR's own prefix in the moving network (including the MR itself). That is, in addition to itself, the number of other MRs from which the MR can receive originating MR advertisement information including its own prefix. |
| $N_{new}$ | The number of MRs that the MR is aware of announcing the prefix of the new MR in the moving network. That is, the number of other MRs from which the MR can receive originating MR advertisement information including the prefix of the new MR. |
| $MNP_{own}$ | The MR's own prefix. |
| $MNP_{new}$ | The prefix of the new MR. |

| Logic: |
|---|
| IF $N_{own} > N_{new}$ THEN do nothing [i.e. keep the old prefix $MNP_{own}$] <br> ELSE IF $N_{own} < N_{new}$ THEN send a BU to the HA requesting to be assigned the prefix of the new MR ($MNP_{new}$) <br> ELSE IF $N_{own} = N_{new}$ [e.g. the case when there is only the MR and the new MR in the moving network, i.e. $N_{own} = 1$ and $N_{new} = 1$] THEN DO <br> { <br> IF $MNP_{new} < MNP_{own}$ THEN send a BU to the HA requesting to be assigned the prefix of the new MR <br> ELSE do nothing [i.e. keep the old prefix $MNP_{own}$] <br> } |

If the HA assigns a new prefix, MR advertisement information should be sent irrespective of the time that is left of the current regular MR advertisement period. This is to facilitate and speed up convergence to a new prefix after a prefix change in a moving network.

This prefix selection principle targets moving network mergers. It will allow the largest (defined by the number of MRs) of the merging moving networks to keep its old prefix.
Prefix Selection Principle 3

When a MR detects (i.e. receives originating MR advertisement information indicating) that another MR that used to share the MR's own prefix has switched to a new prefix, it should according to an embodiment referred to as prefix selection principle 3:

Send a BU to the HA requesting to be assigned the new prefix that the other MR switched to instead of the old one. If the MR was in a waiting state according to either prefix selection 1 or 2, it should exit this waiting state and abort the execution of prefix selection principle 1 or 2.

If the HA assigns a new prefix, send MR advertisement information, irrespective of the time that is left of the current regular MR advertisement period. This is to facilitate and speed up convergence to a new prefix after a prefix change in a moving network.

This principle requires that the MR can uniquely identify another MR, even though the other MR has changed its prefix. This is however not a problem and there are several ways to do it. The preferred way is to use the link-local IPv6 address of the other MR, which is unaffected by prefix changes. The link-local IPv6 address is included in the source address field of the IP header of the message carrying the MR advertisement information, whether this is a router advertisement message or a dedicated MR advertisement message. If MR advertisement information is replicated, the link-local address of the originator of the replicated MR advertisement information is included in the replicated information, as described above.

Another way to uniquely identify another MR across prefix changes, which also can be used in an IPv4 based moving network, is to use the MAC address (i.e. the link layer address). The MAC address can be extracted from the layer 2 part of a received message carrying MR advertisement information. In addition, IPv6 router advertisement messages may optionally include the MAC address in the message body. If desired, it can be mandated that MRs supporting the solution of this invention use this option. Similarly, if desired, the MR advertisement information in the dedicated MR advertisement message could be extended to include the MAC address. If this MR identification method is to be used in combination with the "indirect MR tracking method", the MAC address of the originating MR has to be included in replicated MR advertisement information.

Yet a way to uniquely identify another MR across prefix changes, which can be used in both IPv6 and IPv4 environments, is to use the home address of the MR. The home address would then have to be included in the MR advertisement information, whether replicated or not. If IPv6 router advertisements are to be used for tracking of MRs, i.e. for carrying MR advertisement information, a new option has to be defined for the IPv6 router advertisement message (which however will be backwards compatible, as are any new IPv6 router advertisement options, since RFC 2461 states that received unrecognized options must be ignored). IPv4 router advertisements would not be possible to use in this way, since they are not extensible.

This prefix selection principle complements prefix selection principles 1 and 2 and is hence relevant for both splits and mergers. It ensures that the first MR that switches to a new prefix (among a group of MRs that are collectively about to switch to a new prefix) determines which this new prefix should be. It is also motivated by the assumption that if a MR detects that another MR, which was previously announcing the same prefix as the MR itself, has changed to a new prefix, then this prefix change is probably due to that the other MR has detected a split or a merger that motivates the prefix change, but which split or merger the MR itself has not yet detected. Consequently, the MR follows the example of the other MR and changes its prefix accordingly. This prefix selection principle facilitates and speeds up convergence to a new common prefix within a moving network, when several MRs are involved in a prefix change.
Alternative 2 for Prefix Selection Principle 1

In this variant of prefix selection principle 1, the MRs use the IPv6 Neighbor Discovery mechanism, RFC 2461 (or the ARP mechanism, RFC 826, in IPv4 based moving networks), the ICMPv6 Echo Request/Reply mechanism, RFC 2463 (or the ICMPv4 Echo/Echo Reply mechanism, RFC 792, in IPv4 based moving networks) or layer 2 specific mechanisms to determine the number of nodes in a moving network, which in turn is used as a measure of the size of the moving network.

The number of MRs (although not regular MNNs) may also be determined using the MR tracking mechanisms described above.

Alternative 2 of Prefix Selection Principle 1:

When a MR detects a moving network split (i.e. detects loss of connectivity to another MR), it should:

Send MR advertisement information and solicit MR advertisement information from other MRs. That is, if router advertisements messages are used to advertise MR advertisement information, then a router advertisement message and a router solicitation message are sent. (If the option of introducing a solicitation flag associated with the MR advertisement information is used in router advertisements, as described further below, then this flag should be set in the router advertisement and the router solicitation message can be omitted.) If dedicated MR advertisement messages are used, a MR advertisement message with the solicitation flag set is sent (the solicitation flag is described further below). In either case the MR advertisement information is sent irrespective of the time that is left of the current regular MR advertisement period. This is to quickly get a correct view of which MRs that are still present in the moving network after the split and to facilitate (and speed up) for other MRs to get a similar correct view. Optionally, the MR could send a short series of messages, both advertising and soliciting MR advertisement information, especially if the L1/L2 medium of the moving network is considered unreliable.

Determine the number of nodes in the moving network (including the MR itself) using either of (or a combination of all or a subset of) the above-mentioned means.

Wait a time $t=n \times p+d$, where n is the number of other nodes (i.e. excluding the MR itself) in the moving network, p is a certain predefined time period, and d is a random delay $0 \leq d < p$.

Send a BU to the HA requesting to be reassigned the same prefix. (The HA will apply any of the above-mentioned local connectivity tests and reassign the same prefix if the test succeeds, but assign another prefix, or possibly simply reject the BU, if the test fails.)

If the HA assigns a new prefix, send MR advertisement information, irrespective of the time that is left of the current regular MR advertisement period. This is to facilitate and speed up convergence to a new prefix after a prefix change in a moving network.

Alternative 3 for Prefix Selection Principle 1

In this variant of prefix selection principle 1, the MRs use an individual rating parameter, r, as a measure of the "value" of the moving network, i.e. a measure of the potential consequences of a prefix change in the moving network. This individual rating parameter could be a function of one or a number of input parameters, such as the number of known ongoing TCP sessions (or other sessions) through the MR, the number of nodes in the moving network, the number of MRs in the moving network, configured parameters, etc.

Each MR maintains a value of the individual rating parameter, r, representing its individual perception of the "value" of the moving network. The rating parameter could be associated with a certain prefix (in case several prefixes are used in the moving network) or with the moving network as such.

When using the rating parameters to estimate a "value" of the moving network a MR computes a "collective rating parameter", R, of the individual rating parameters of all the MRs in the moving network. Thus, in a sense, R, represents the collective perception of the "value" of the moving network, taking the views of all the MRs in the moving network into account.

R can be calculated in two different ways, depending on the nature or r. If r is based on input data that pertain to properties of each individual MR, such as the number of ongoing sessions through the MR, then R is calculated as the sum of the individual rating parameters of all the MRs in the moving network. If r is based on input data pertaining to properties of the entire moving network, such as the number of nodes in the moving network, then R is calculated as a mean value of the individual rating parameters of all the MRs in the moving network.

If the input parameters to the calculation of r include only data that is consistent (the same) in all MRs in a moving network, then it can be assumed that all MRs have the same value of their respective r parameter. Hence, in such cases, calculation of R is as simple as setting $R=r$ (if R is to be calculated as a mean value of the r parameters) or $R=n \times r$, where n is the number of MRs in the moving network (if R is to be calculated as the sum of the r parameters).

However, if the input parameters to the calculation of r include data of a nature that inherently makes it differ from MR to MR, such as the number of known ongoing TCP sessions (or other sessions), then a MR must have access to the r parameters of all the other MRs in the moving network in order to be able to calculate R as a "real" mean value or a "real" sum of the r parameters of all the MRs in the moving network. Thus, in such case each MR also includes its individual rating parameter, r, in the MR advertisement information (see section.

Alternative 3 of Prefix Selection Principle 1:

When a MR detects a moving network split (i.e. detects loss of connectivity to another MR), it should:

(It should be noted that the step below is performed only if the number of MRs in the moving network is an input parameter to the calculation of r (and thus R).

Send MR advertisement information and solicit MR advertisement information from other MRs. That is, if router advertisement messages are used to advertise MR advertisement information, then a router advertisement message and a router solicitation message are sent. (If the option of introducing a solicitation flag associated with the MR advertisement information is used in router advertisements, as described further below, then this flag should be set in the router advertisement and the router solicitation message can be omitted.) If dedicated MR advertisement messages are used, a MR advertisement message with the solicitation flag set is sent (the solicitation flag is described further below). In either case the MR advertisement information is sent irrespective of the time that is left of the current regular MR advertisement period. This is to quickly get a correct view of which MRs that are still present in the moving network after the split and to facilitate (and speed up) for other MRs to get a similar correct view. Optionally, the MR could send a short series of messages, both advertising and soliciting MR advertisement information, especially if the L1/L2 medium of the moving network is considered unreliable.

Compute an updated value of r (after gathering the required input data, if needed).

The step below is performed only if all the individual r parameters are needed in order to calculate R.

Send MR advertisement information, including the updated r parameter, and solicit MR advertisement information from other MRs. That is, if router advertisements messages are used to advertise MR advertisement information, then a router advertisement message and a router solicitation message are sent. (If the option of introducing a solicitation flag associated with the MR advertisement information is used in router advertisements, as described further below, then this flag should be set in the router advertisement and the router solicitation message can be omitted.) If dedicated MR advertisement messages are used, a MR advertisement message with the solicitation flag set is sent (the solicitation flag is described further below). In either case the MR advertisement information is sent irrespective of the time that is left of the current regular MR advertisement period. The purpose is to immediately advertise the updated r parameter to other MRs. Optionally, the MR could send a short series of messages, both advertising and soliciting MR advertisement information, especially if the L1/L2 medium of the moving network is considered unreliable.

The step below is performed only if all the individual r parameters are needed in order to calculate R.

Wait one MR advertisement period (if the MR advertisement periods are randomized within a minimum and a maximum value, the maximum value should be assumed) or, if this occurs first, until originating MR advertisement information has been received from all other MRs that the MR was previously aware of, except the one whose loss of connectivity triggered the split detection. This is to ensure that the MR has received updated r parameters from all other MRs in the moving network after the split (and to thus ensure that all MRs will compute the same value of R). If the L1/L2 medium of the moving network is considered fairly reliable, it may be assumed that the solicitation for MR advertisement reached all remaining MRs in the moving network and then the waiting time can be set to a smaller value than one MR advertisement period.

Compute R as the mean or sum of the individual r parameters of all the MRs that remain in the moving network after the split, including the MR itself (or set R=r or R=n×r if the r parameters of the other MRs are not needed). Wait an additional time t=f(R)×p+d, where f(R) is a function of R (which grows with growing values or R), p is a certain predefined time period, and d is a random delay $0 \leq d < p$.

Send a BU to the HA requesting to be reassigned the same prefix. The HA will apply any of the local connectivity tests described above and reassign the same prefix if the test succeeds, but assign another prefix, or possibly simply reject the BU, if the test fails.

If the HA assigns a new prefix, send MR advertisement information, irrespective of the time that is left of the current regular MR advertisement period. This is to facilitate and speed up convergence to a new prefix after a prefix change in a moving network.

Alternative 2 for Prefix Selection Principle 2

A further alternative of the above-mentioned prefix selection principle 2 is described below that takes into account that potential error conditions may render the MRs in the moving network to have different perceptions of the number of MRs announcing different prefixes in the moving network.

Alternative 2 for Prefix Selection Principle 2:

When a MR detects a moving network merger (i.e. detects a new MR announcing another prefix than the MR's own prefix), it should:

Send MR advertisement information and solicit MR advertisement information from other MRs. That is, if router advertisements messages are used to advertise MR advertisement information, then a router advertisement message and a router solicitation message. (If the option of introducing a solicitation flag associated with the MR advertisement information is used in router advertisements, as described further below, then this flag should be set in the router advertisement and the router solicitation message can be omitted.) If dedicated MR advertisement messages are used, a MR advertisement message with the solicitation flag set is sent (the solicitation flag is described further below). In either case the MR advertisement information is sent irrespective of the time that is left of the current regular MR advertisement period. This is to quickly get a correct view of which MRs that are present in the merged moving network and what prefix(es) they use and to facilitate (and speed up) for other MRs to get a similar correct view. Optionally, the MR could send a short series of messages, both advertising and soliciting MR advertisement information, especially if the L1/L2 medium of the moving network is considered unreliable.

Wait one MR advertisement period (if the MR advertisement periods are randomized within a minimum and a maximum value, the maximum value should be assumed). This is to ensure that the MR has detected all new MRs in the merged moving network, before determining whether to change prefix or not. If the L1/L2 medium of the moving network is considered fairly reliable, it may be assumed that the solicitation for MR advertisement reached all the MRs in the merged moving network and then the waiting time can be set to a smaller value than one MR advertisement period.

Execute the following logic using the same notation as in alternative 1:

```
IF N_own > N_new THEN DO
{
[The following handles the case when the new MR also thinks that the above condition
is fulfilled (from its point of view), so that none of MRs thinks it should change prefix.]
endOfWaitingTime = currentTime + suitableWaitingTime; [The
suitableWaitingTime constant may be e.g. 1 or 2 MR advertisement period(s) or shorter
depending on how reliable the L1/L2 medium of the moving network can be assumed to be.]
WHILE currentTime < endOfWaitingTime DO
{
IF the new MR has changed its prefix to my prefix (MNP_own) THEN
endOfWaitingTime = currentTime;
IF an event that affects the prefix selection logic occurs in the meantime THEN
stop waiting, exit this logic and handle the new event;
}
IF the new MR has not changed its prefix to my prefix (MNP_own) THEN DO
{
IF MNP_new < MNP_own THEN send a BU to the HA requesting to be assigned the
prefix of the new MR (MNP_new)
ELSE do nothing [i.e. keep the old prefix MNP_own]
}
ELSE do nothing [i.e. keep the old prefix MNP_own]
}
ELSE IF N_own < N_new THEN DO
```

```
{
Send a BU to the HA requesting to be assigned the prefix of the new MR (MNP$_{new}$);
[The following handles the case when the new MR also thinks that the above
condition is fulfilled (from its point of view), so that both MRs change prefix.]
endOfWaitingTime = currentTime + suitableWaitingTime; [The
suitableWaitingTime constant may be e.g. 1 or 2 MR advertisement period(s) or
shorter depending on how reliable the L1/L2 medium of the moving network
can be assumed to be.]
WHILE currentTime < endOfWaitingTime DO
{
IF the new MR has changed its prefix to my prefix (MNP$_{own}$) THEN
endOfWaitingTime = currentTime;
IF an event that affects the prefix selection logic occurs in the meantime THEN
stop waiting, exit this logic and handle the new event;
}
IF the new MR has changed to my prefix (MNP$_{own}$) THEN DO
{
IF MNP$_{new}$ < MNP$_{own}$ THEN do nothing [i.e. keep the new prefix MNP$_{new}$]
ELSE send a BU to the HA requesting to be assigned my old prefix (MNP$_{own}$)
}
ELSE do nothing [i.e. keep the new prefix MNP$_{new}$]
}
ELSE IF N$_{own}$ = N$_{new}$ [e.g. the case when there is only the MR and the new MR
in the moving network, i.e. N$_{own}$ = 1 and N$_{new}$ = 1] THEN DO
{
IF MNP$_{new}$ < MNP$_{own}$ THEN send a BU to the HA requesting to be assigned the
prefix of the new MR (MNP$_{new}$)
ELSE do nothing [i.e. keep the old prefix MNP$_{own}$]
}
```

If the HA assigns a new prefix, send MR advertisement information, irrespective of the time that is left of the current regular MR advertisement period. This is to facilitate and speed up convergence to a new prefix after a prefix change in a moving network.

Alternative 3 for Prefix Selection Principle 2

A yet further alternative of the above-mentioned prefix selection principle 2 is described below. In this variant of prefix selection principle 2, each MR uses the IPv6 Neighbor Discovery mechanism. (or the ARP mechanism in IPv4 based moving networks), the ICMPv6 Echo Request/Reply mechanism (or the ICMPv4 Echo/Echo Reply mechanism in IPv4 based moving networks) or layer 2 specific mechanisms to determine the number of nodes in the moving network that use the prefix of the MR. The number of MRs (although not regular MNNs) using the prefix may also be determined using the above-described MR tracking mechanisms. Each MR includes the number of nodes using its prefix in the MR advertisement information.

Alternative 3 for Prefix Selection Principle 2:

When a MR detects a moving network merger (i.e. detects a new MR announcing another prefix than the MR's own prefix), it should:

Send MR advertisement information in a router advertisement message or a dedicated MR advertisement message as described above, irrespective of the time that is left of the current regular MR advertisement period. This is to facilitate (and speed up) for MRs in the other moving network with which the merger is taking place to receive the information required for prefix selection. Optionally, the MR could send a short series of messages including the MR advertisement information, especially if the L1/L2 medium of the moving network is considered unreliable.

Execute the following logic using the following notation (this is the same logic as in alternative 1 for prefix selection principle 2 with the number of MRs announcing the MR's prefix replaced by the number of nodes using the MR's prefix):

| Notation: | |
|---|---|
| N$_{nodes-own}$ | The number of nodes that the MR is aware of using the MR's own prefix in the moving network (including the MR itself). |
| N$_{nodes-new}$ | The number of nodes that the other MR indicates (in its MR advertisement information) are using the other MR's prefix. |
| MNP$_{own}$ | The MR's own prefix. |
| MNP$_{new}$ | The prefix of the new MR. |

| Logic: |
|---|
| IF N$_{nodes-own}$ > N$_{nodes-new}$ THEN do nothing [i.e. keep the old prefix MNP$_{own}$] |
| ELSE IF N$_{nodes-own}$ < N$_{nodes-new}$ THEN send a BU to the HA requesting to be assigned the prefix of the new MR (MNP$_{new}$) |
| ELSE IF N$_{nodes-own}$ = N$_{nodes-new}$ THEN DO |
| { |
| IF MNP$_{new}$ < MNP$_{own}$ THEN send a BU to the HA requesting to be assigned the prefix of the new MR |
| ELSE do nothing [i.e. keep the old prefix MNP$_{own}$] |
| } |

If the HA assigns a new prefix, MR advertisement information should be sent irrespective of the time that is left of the current regular MR advertisement period. This is to facilitate and speed up convergence to a new prefix after a prefix change in a moving network.

Alternative 4 for Prefix Selection Principle 2

A yet further alternative of the above-mentioned prefix selection principle 2 is described below. In this variant of the prefix selection principle 2, each MR uses an individual rating parameter associated with its prefix, r. The rating parameter has similar properties as the individual rating parameter described in conjunction with alternative 3 for prefix selection principle 1. However, in this case the input data to the rating parameter is restricted to data that pertain to the properties of the entire moving network and that can be assumed to be consistent among the MRs of a moving network (or the MRs using a certain prefix). That is, this alternative for prefix selection principle 2 is applicable only to cases when it can be assumed that R=r. However, each MR is still required to include its individual rating parameter in the MR advertisement information.

Alternative 4 for Prefix Selection Principle 2:

When a MR detects a moving network merger (i.e. detects a new MR announcing another prefix than the MR's own prefix), it should:

Send MR advertisement information in a router advertisement message or a dedicated MR advertisement message as described above, irrespective of the time that is left of the current regular MR advertisement period. This is to facilitate (and speed up) for MRs in the other moving network with which the merger is taking place to receive the information required for prefix selection. Optionally, the MR could send a short series of messages including the MR advertisement information, especially if the L1/L2 medium of the moving network is considered unreliable.

Execute the following logic using the following notation (this is the same logic as in alternative 1 for prefix selection principle 2 with the number of MRs announcing the MR's prefix replaced by rating parameter, r):

| Notation: | |
|---|---|
| $r_{own}$ | The rating parameter of the MR |
| $r_{new}$ | The rating parameter announced by the other MR. |
| $MNP_{own}$ | The MR's own prefix. |
| $MNP_{new}$ | The prefix of the new MR. |

| Logic: |
|---|
| IF $r_{own} > r_{new}$ THEN do nothing [i.e. keep the old prefix $MNP_{own}$] ELSE IF $r_{own} < r_{new}$ THEN send a BU to the HA requesting to be assigned the prefix of the new MR ($MNP_{new}$) ELSE IF $r_{own} = r_{new}$ THEN DO { IF $MNP_{new} < MNP_{own}$ THEN send a BU to the HA requesting to be assigned the prefix of the new MR ELSE do nothing [i.e. keep the old prefix $MNP_{own}$] } |

If the HA assigns a new prefix, MR advertisement information should be sent irrespective of the time that is left of the current regular MR advertisement period. This is to facilitate and speed up convergence to a new prefix after a prefix change in a moving network.

Alternative 5 for Prefix Selection Principle 2

A yet further alternative of the above-mentioned prefix selection principle 2 is described below. In this variant of the prefix selection principle 2, each MR uses an individual rating parameter associated with its prefix, r, and a collective rating parameter, R, representing the individual r parameters of all the MRs announcing the same prefix as measures of the "value" of the moving network (or maybe more accurately, "the value of the MR's prefix"), i.e. as measures of the potential consequences of a prefix change. The possible properties of r and R are the same as described in conjunction with alternative 3 for prefix selection principle 1 (i.e. in this case the input data to the r parameter is not restricted as for alternative 4 for prefix selection principle 2). Each MR includes both its individual rating parameter, r, and the collective rating parameter, R, in the MR advertisement information.

Alternative 5 for Prefix Selection Principle 2:

When a MR detects a moving network merger (i.e. detects a new MR announcing another prefix than the MR's own prefix), it should:

Send MR advertisement information (in a router advertisement message or a dedicated MR advertisement message as described above), irrespective of the time that is left of the current regular MR advertisement period. This is to facilitate (and speed up) for MRs in the other moving network with which the merger is taking place to receive the information required for prefix selection. Optionally, the MR could send a short series of messages including the MR advertisement information, especially if the L1/L2 medium of the moving network is considered unreliable.

Execute the following logic using the following notation (this is the same logic as in alternative 1 for prefix selection principle 2 with the number of MRs announcing the MR's prefix replaced by R):

| Notation: | |
|---|---|
| $R_{own}$ | The R parameter of the MR. |
| $R_{new}$ | The R parameter announced by the other MR. |
| $MNP_{own}$ | The MR's own prefix. |
| $MNP_{new}$ | The prefix of the new MR. |

| Logic: |
|---|
| IF $R_{own} > R_{new}$ THEN do nothing [i.e. keep the old prefix $MNP_{own}$] ELSE IF $R_{own} < R_{new}$ THEN send a BU to the HA requesting to be assigned the prefix of the new MR ($MNP_{new}$) ELSE IF $R_{own} = R_{new}$ THEN DO { IF $MNP_{new} < MNP_{own}$ THEN send a BU to the HA requesting to be assigned the prefix of the new MR ELSE do nothing [i.e. keep the old prefix $MNP_{own}$] } |

If the HA assigns a new prefix, then MR advertisement information should be sent irrespective of the time that is left of the current regular MR advertisement period. This is to facilitate and speed up convergence to a new prefix after a prefix change in a moving network.

Alternative 6 for Prefix Selection Principle 2

A yet further alternative of the above-mentioned prefix selection principle 2 is described below. This is a very simple variant of prefix selection principle 2, in which neither the sizes nor the "values" of the merging moving networks are considered. Instead the prefix is selected based solely on a comparison of the prefixes.

Alternative 6 for Prefix Selection Principle 2:

When a MR detects a moving network merger (i.e. detects a new MR announcing another prefix than the MR's own prefix), it should:

Send MR advertisement information in a router advertisement message or a dedicated MR advertisement message as described above, irrespective of the time that is left of the current regular MR advertisement period. This is to facilitate (and speed up) for MRs in the other moving network with which the merger is taking place to receive the information required for prefix selection. Optionally, the MR could send a short series of messages including the MR advertisement information, especially if the L1/L2 medium of the moving network is considered unreliable.

Execute the following logic using the following notation:

| Notation: | |
|---|---|
| $MNP_{own}$ | The MR's own prefix. |
| $MNP_{new}$ | The prefix of the new MR. |

| Logic: |
|---|
| IF $MNP_{new} < MNP_{own}$ THEN send a BU to the HA requesting to be assigned the prefix of the new MR ELSE do nothing [i.e. keep the old prefix $MNP_{own}$] |

If the HA assigns a new prefix, then MR advertisement information should be sent, irrespective of the time that is left of the current regular MR advertisement period. This is to facilitate and speed up convergence to a new prefix after a prefix change in a moving network.

Reduction of Time Period T1

If minimizing the time period T1, i.e. the time period between a moving network split and the detection of the split as shown in FIG. 4, is a priority, then the timing parameters governing the split detection mechanism should be configured with more emphasis on speed than on network (and processing) load (which is the other part of the trade-off. In the basic case this means having short MR advertisement periods.

If pair-wise probe-response messages are used, these should be exchanged frequently. If the aliveness monitoring mechanism of a routing protocol is utilized, this should use frequent aliveness tests, e.g. frequent OSPF Hello Packets, e.g. described in RFC 2328 and RFC 2740. It is also possible to detect loss of connectivity through link-layer mechanisms, e.g. loss of Bluetooth or IEEE 802.11 connections/associations, notified through a layer 2 triggering API.

The prefix selection principle 3 is also advantageous in this context, since it is designed to speed up prefix convergence after a moving network split or merger. It does not reduce the time until the first MR detects the split, but after that it can make other MRs follow the split detecting MR's prefix change in a chain reaction.

Reduction of Time Period T2

The most efficient way to reduce time period T2 as shown in FIG. 4, i.e. the time period between a MR's prefix change after detecting a moving network split until the MNNs start using the new prefix, and maybe more importantly, stop using the old prefix, is to utilize the inherent capabilities of the IPv6 router advertisement mechanism.

The MR should of course immediately start advertising the new prefix, but for a certain time period, or a certain number of consecutive router advertisements, it should also advertise the old prefix, but with both the Valid Lifetime and the Preferred Lifetime parameters (described in RFC 2461) set to zero for the old prefix. The MR should send the first such router advertisement immediately after receiving the new prefix. According to RFC 2461, this will trigger the MNNs receiving the router advertisement to immediately invalidate/time out the old prefix. (A MNN may however keep the old prefix for a while even after receiving a router advertisement with the Valid Lifetime and Preferred Lifetime parameters set to zero as a precaution mechanism protecting against false router advertisements.)

A problem with this approach is that ongoing sessions through the MR will be broken when the old prefix is invalidated. To mitigate this problem a compromise may be to give the MNNs a grace period by advertising a small but non-zero Valid Lifetime parameter and a Preferred Lifetime parameter set to zero for the old prefix to gracefully time out the old prefix. This would allow the MNNs to start using the new prefix for new sessions and would hopefully give enough time for most of the old sessions to end without being broken by an invalidated prefix. For ongoing sessions to be maintained it is however not enough to retain the old prefix. Since the original moving network has been split and another MR, which is now located in another moving network, is also using the old prefix, flow management mechanisms are needed to ensure that the HA sends the downlink flow of a session using the old prefix to the MR through which the uplink flow of the same session is conveyed. Yet a prerequisite for maintaining ongoing sessions using the old prefix is that the HA accepts that the MR uses the old prefix for a while even after assigning the new prefix to the MR and despite the failed local connectivity test for the old prefix. Thus, with this graceful approach the HA would not immediately delete its association between the MR and the old prefix. It would retain the association, subject to a timer that would preferably be set to time out at the same time as the MR finally invalidates the old prefix. The HA should also set a flag or some other indication (e.g. using the running timer as an implicit indication) to ensure that if the MR tries to have the prefix reassigned again (again with a failed local connectivity test), the HA should not restart the timer, but instead leave it running.

If the MR is using flow management mechanisms, it has reasonably good view of the sessions that are ongoing through it. The MR can use this to have a flexible approach to the timing out of the old prefix. If there are no ongoing sessions through the MR, it can immediately invalidate the old prefix (i.e. by advertising the old prefix with the Valid Lifetime and Preferred Lifetime parameters set to zero). If there are ongoing sessions through the MR, the MR may choose the graceful timeout approach. However, even if the MR has started to gracefully time out the old prefix, if the last session using the old prefix ends before the old prefix is timed out, the MR will immediately invalidate the old prefix by sending a router advertisement with the Valid Lifetime and Preferred Lifetime parameters set to zero for the old prefix.

Another mechanism that is relevant in this context is the "source address failed ingress/egress policy" indication through ICMPv6 (RFC 2463). A MR should return an ICMPv6 Destination Unreachable message with this indication to a MNN trying to send a packet through the MR with a source address including an invalid prefix. A MNN receiving such an ICMPv6 Destination Unreachable message will notify the upper-layer process, which may take appropriate actions.

Relying on the IPv6 Neighbor Unreachable Detection (NUD) mechanism as described in RFC 2461 would not be sufficient for reduction of time period T2. A broken TCP connection through a MR that has stopped using an old prefix will no longer provide reachability confirmations to the MNN. Nevertheless, the triggered neighbor solicitation probing of the MR will generate a neighbor advertisement response and thus confirm reachability to the MR, since the link-local address of the MR, which is stable across prefix changes, is used for the neighbor solicitation and neighbor advertisement messages in the NUD procedure. Furthermore, although the NUD mechanism can trigger the Next-hop-determination procedure also described in RFC 2461, it does not necessarily impact the source address selection. The NUD mechanism is however useful to make a MNN stop trying to use the MR(s) that after the moving network split is(are) located in another moving network.

Reduction of Time Period T3

If minimizing the time period T3, i.e. the time period between a moving network merger and the detection of the merger, according to FIG. 5, is a priority, then the timing parameters governing the merger detection mechanism should be configured with more emphasis on speed than on network (and processing) load (which is the other part of the trade-off). In the basic case this means having short MR advertisement periods.

If the aliveness monitoring mechanism of a routing protocol is utilized, this should use frequent aliveness tests, e.g. frequent OSPF Hello Packets.

The prefix selection principle 3 is also advantageous in this context, since it is designed to speed up prefix convergence after a moving network split or merger. It does not reduce the time until the first MR detects the merger, but after that it can make other MRs follow the merger detecting MR's prefix change in a chain reaction.

Reduction of Time Period T4

Time period T4 according to FIG. 5 refers to the time period between a MR's prefix change after detecting a moving network merger until the MNNs start using the new prefix, and more importantly, stop using the old prefix. The means for reducing this time period, as well as the possible compromises in consideration of ongoing sessions, are the same as for time period T2. This should come as no surprise since the only difference between these two cases is what triggered the MR to change its prefix, whereas it is the prefix change as such, not its triggering cause, that affects the MNN and thus time periods T2 and T4.

Additional Means to Reduce the Negative Consequences for MNNs

Reducing the time periods T1, T2, T3 and T4 are not the only ways to reduce the negative consequences for the MNNs in a moving network that is subject to a split or a merger.

Another simple means to reduce the negative impacts on the MNNs during time period T1 involves the IPv6 Neighbor Unreachability Detection (NUD) mechanism. As described above, a MNN using the NUD mechanism can detect loss of connectivity to a MR and switch to another MR for ongoing sessions and session establishment attempts. Keeping the parameters governing the timing of the NUD procedure small can speed up this process. Therefore the MRs could advertise small values (i.e. smaller than default values) for the ReachableTime and RetransTimer parameters (which are used for remote configuration of the parameters governing the timing of the NUD procedure according to RFC 2461) in their router advertisements. Specifically a MNN uses the advertised Reachable Time parameter when calculating its ReachableTime parameter, which governs how often the NUD algorithm requires confirmations of reachability to another node. A MNN uses the advertised Retrans Timer parameter as the value for its RetransTimer parameter, which governs the retransmission interval that the NUD algorithm is using when probing another node with Neighbor Solicitation messages.

Furthermore, use of flow management mechanisms can improve the situation for the MNNs during time periods T1 and T2. Keeping the data flows of both directions in a session consistently to the same MR reduces the risk that the session is broken during a moving network split. The reason is that using separate MRs for the two flow directions (or arbitrary MRs for the MNN terminating flow direction), which may well happen without a flow management mechanism, increases the risk that an MR that the MNN no longer can reach is used.

Yet a mechanism that could possibly be used to reduce the negative impacts of a prefix change on the MNNs, i.e. to reduce the negative consequences for the MNNs during time periods T2 and T4, is to use a Network Address Translator (NAT) in a MR. During a transient period after a prefix change it would be possible for a MR to use a NAT mechanism to translate between addresses using the old prefix and one or more address(es) using the new prefix. This approach would only be useful for new sessions being established using the old prefix, since inserting the NAT in flows pertaining to already ongoing sessions would break the sessions.

Figure 7:
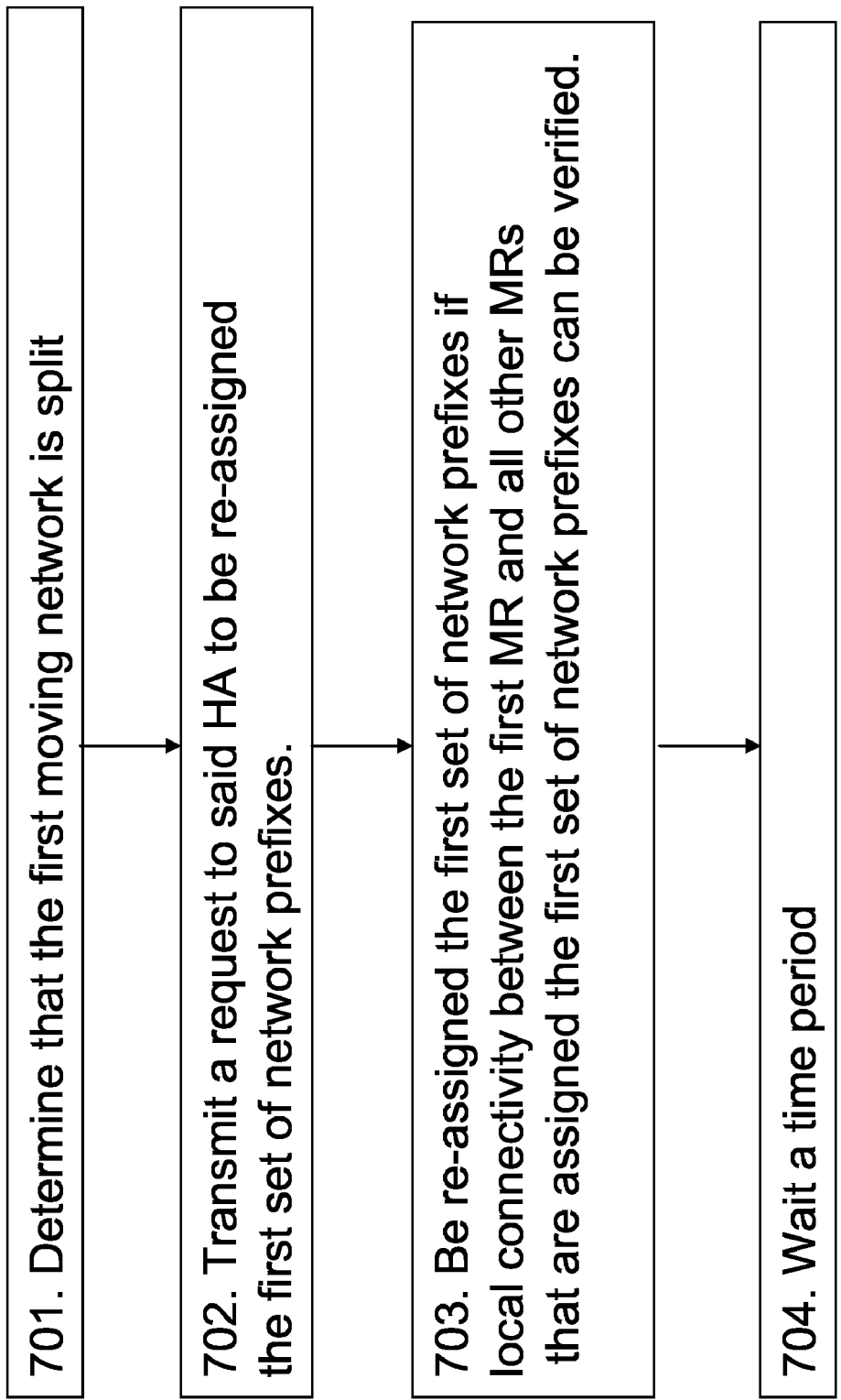
FIG. 7 is a flowchart of the method relating to a split according to the present invention.

The present invention also relates to methods for maintaining prefix consistency during splits and mergers. The first method relating to splits is illustrated by the flowchart of FIG. 7 and is a method in a first mobile router, connectable to a first moving network associated to a home agent, HA, the first moving network comprises at least a second MR, wherein each of the MRs has a relation with said HA and is assigned a first set of network prefixes identifying the first moving network. The method comprises the steps of:

701. Determine that the first moving network is split into a second and a third moving network such that the first MR belongs to the second moving network.
702. Transmit a request to said HA to be re-assigned the first set of network prefixes.
703. Be re-assigned the first set of network prefixes if local connectivity between the first MR and all other MRs that are assigned the first set of network prefixes can be verified.
704. Wait a time period after determining that the first moving network has been split before transmitting a request to said HA to be re-assigned the first set of network prefixes.

Figure 8:
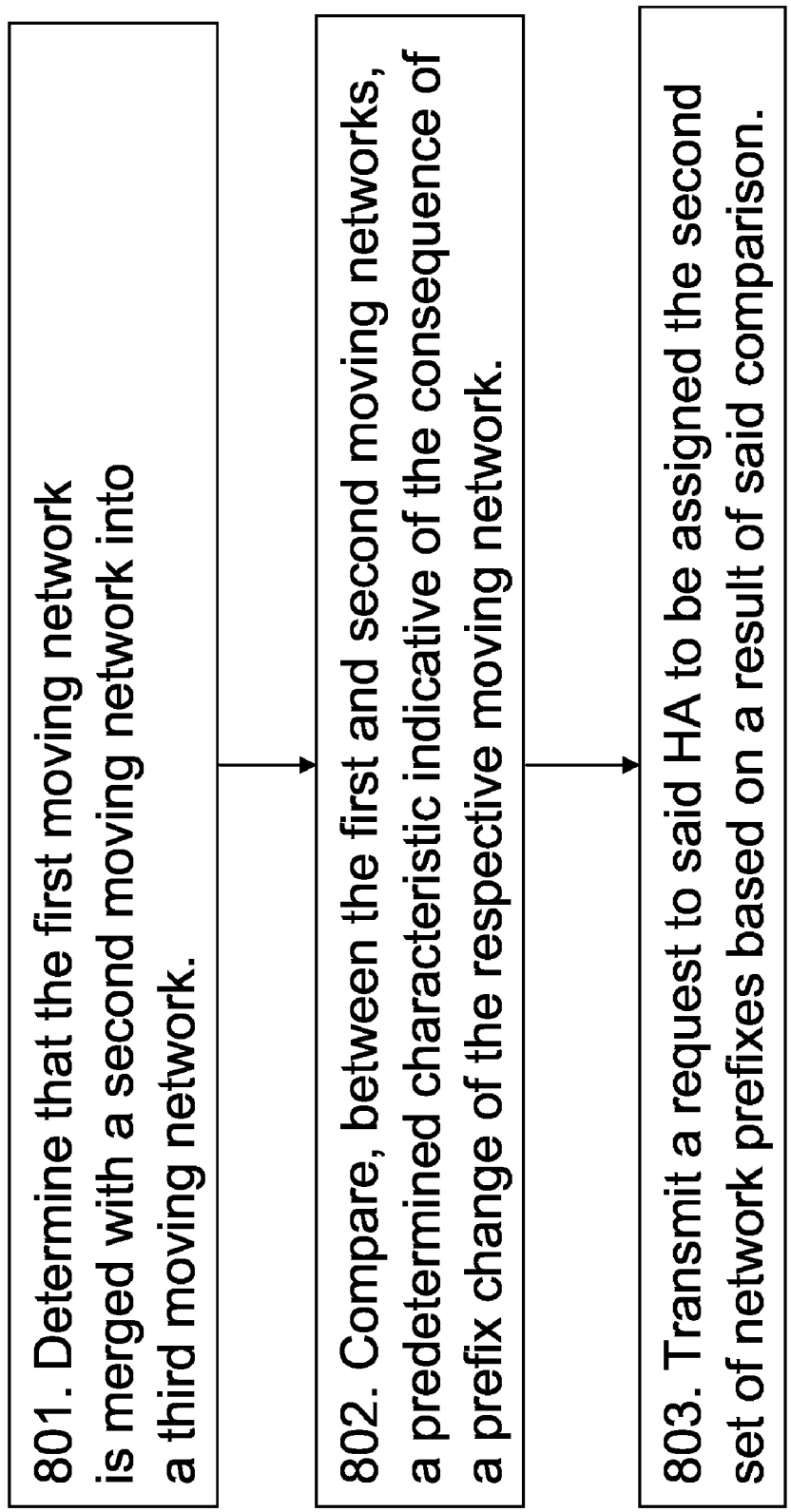
FIG. 8 is a flowchart of the method relating to a merger according to the present invention.

The second method relating to mergers is illustrated by the flowchart of FIG. 8, and is a method in a first mobile router connectable to a first moving network associated to a home agent adapted to be assigned a first set of network prefixes identifying the first moving network. The method comprises the steps of:

801. Determine that the first moving network is merged with a second moving network into a third moving network, the second moving network comprises at least a second MR, wherein each of the at least second MR has a relation with said HA (406) and is assigned a second set of network prefixes identifying the second moving network.
802. Compare, between the first and second moving networks, a predetermined characteristic indicative of the consequence of a prefix change of the respective moving network.
803. Transmit a request to said HA to be assigned the second set of network prefixes based on a result of said comparison.

Extensions and Generalizations

Generalization to Multiple Prefixes

The present invention has mostly been described in terms of a MR being assigned a single prefix, but it can be generalized to multiple prefixes. I.e. the MR could be assigned a set of prefixes comprising one or more prefixes.

The dynamic prefix assignment and the above described local connectivity tests are already adapted to multiple prefixes. For the remaining parts of the basic solution this adaptation in general consists of making the methods, mechanisms and algorithms operate on sets of prefixes rather than single prefixes, making a single prefix a special case of the general case of multiple prefixes.

In this general case maintaining prefix consistency means that all MRs in a moving network should use the same set of prefixes and no prefix should be used in more than one moving network (not in more than one network in general—whether moving or fixed). For the most part generalizing the basic solution according to this principle is straightforward.

The MR tracking mechanisms are easily adapted to multiple prefixes. MR advertisement information can contain multiple prefixes as well as a single prefix. Existing router advertisement messages are for instance already designed for multiple prefixes.

Split and merger detection are equally easy to generalize. Split detection, which is built on connectivity monitoring, is not affected at all. The same goes for merger detection, which is based on discovering new MRs announcing new prefix(es).

Also the various methods to reduce the time periods T1, T2, T3 and T4, as well as the additional means to reduce the negative consequences for the MNNs are inherently capable of handling multiple prefixes. They utilize timing parameters and existing mechanisms that are either independent of the number of prefixes or inherently designed for multiple prefixes. Also the NAT mechanisms suggested above work equally well for multiple prefixes. When translating an address with a timed out prefix, the NAT simply chooses one of its available valid prefixes to build an address from.

The only part of the basic solution that requires some more or less significant adaptations is the selection of prefixes after a split or a merger in order to achieve prefix convergence and to reestablish prefix consistency.

When executing the algorithms for selection and change of prefix a MR is, in the generalized scenario, faced with sets of prefixes to compare, instead of single prefixes, and each individual prefix in a set may have its own unique properties and input parameters to the algorithms. Comparing various combinations of individual prefixes is hardly feasible (at least not with acceptable complexity and performance characteristics). Nor is selecting a single prefix out of each set as a "champion" representing the set in a comparison an attractive solution. There are no generally good principles for how such a "champion prefix" would be selected.

A better approach (in line with the above described principle of selecting an entire set of prefixes rather than individual prefixes) is to choose the input parameters to the algorithm for each set on a parameter-by-parameter basis. Then, when input parameters for the prefix selection are chosen, for each parameter that is chosen the one (assuming they might differ between the prefixes in the same set) in the set that speaks most in favor of selecting the set (e.g. always choose the smallest prefix from the set when comparing which prefix that is the smallest, or if the rating parameter differs between the prefixes in the set, the greatest one should be chosen as input parameter, etc.).

As an example, let's assume that the algorithm for selection and change of prefix requires two input parameters, X and Y, from each set of prefix. Let's further assume that there are two sets of prefixes, A and B, to be compared, a first one with two prefixes, $MNP_{A-1}$ and $MNP_{A-2}$, and a second one with three prefixes, $MNP_{B-1}$, $MNP_{B-2}$ and $MNP_{B-3}$. Each prefix in each set then has its own instances of the two concerned parameters. The parameters of $MNP_{A-1}$ are denoted $X_{A-1}$ and $Y_{A-1}$, the parameters of $MNP_{A-2}$ are denoted $X_{A-2}$ and $Y_{A-2}$ and following the same naming convention the parameters of the prefixes of set B are denoted $X_{B-1}$ and $Y_{B-1}$, $X_{B-2}$ and $Y_{B-2}$ and $X_{B-3}$ and $Y_{B-3}$ for the respective prefixes. The X parameter that will be fed into the algorithm from set A is the one of $X_{A-1}$ and $X_{A-2}$ that promotes selection of set A the most. Similarly, the Y parameter that will be fed into the algorithm from set A is the one of $Y_{A-1}$ and $Y_{A-2}$ that promotes selection of set A the most. The parameters to be fed into the algorithm from set B are selected according to the same principle, i.e. the one of $X_{B-1}$, $X_{B-2}$ and $X_{B-3}$ and the one of $Y_{B-1}$, $Y_{B-2}$ and $Y_{B-3}$ that promote selection of set B the most are selected.

Hence the modifications of the mechanisms for selection and change of prefix that are needed in order to generalize the mechanisms to multiple prefixes consist of the above described principle for selecting input parameters to the algorithms and the generalization that the resulting prefix selection and possible dynamic prefix assignment concern a selected set of prefixes and a dynamically assigned set of prefixes. The execution of the actual algorithms will therefore in essence remain the same despite the generalization. In this context a single prefix is simply considered a special case of a set of prefixes.

Another way of generalizing to multiple prefixes is to use a completely different principle for selection and change of prefixes after a moving network merger. Instead of choosing one of the prefix sets that the merging moving networks each contribute with, all MRs in the merged moving network embrace all the contributed prefixes (i.e. all MRs end up with the same set of prefixes representing the union of all the prefix sets that the different merging moving networks contributed with).

A problem with this approach may be that in theory consecutive mergers would accumulate an arbitrary number of prefixes. A possible solution could be that the HA (based on a policy) limits the number of prefixes that a MR is allowed to use simultaneously. The HA would then have to make sure to limit the prefixes for the MRs of a moving network in a synchronized manner, so that the same prefix is "pruned" from the set of prefixes of each MR. To achieve that the HA should select the prefix(es) to be pruned from a certain set of prefixes according to a consistent principle, so that consecutive pruning of the same prefix set in different MRs will result in the same reduced set of prefixes. The selection principle could be to prune the shortest, the smallest, the oldest (in terms of continuous use), the newest, etc., but it may not be an arbitrary choice.

Assume for example that MR-X and MR-Y merge their respective moving networks. MR-X contributes with prefixes MNP1 and MNP2 and MR-Y contributes with prefixes MNP3 and MNP4. Assume further that the policy of the HA is to limit the number of prefixes of a MR to three and that the pruning selection principle the HA uses points out MNP3 to be pruned from the prefix set consisting of MNP1, MNP2, MNP3 and MNP4.

When MR-X sends a BU to the HA requesting to have MNP3 and MNP4 assigned, the HA accepts the request for MNP4 (assuming a successful local connectivity test), but not for MNP3. The HA indicates the rejection of MNP3 in a new mobility option, or by including MNP3 in a Mobile Network Prefix option, in the BA. Alternatively, instead of indicating the rejected prefix, the HA may indicate the all prefixes that the MR are currently assigned (authorized), i.e. in MNP1, MNP2 and MNP4 but not MNP3 in this example. In this alternative the HA would indicate these authorized prefixes in one or multiple new mobility option(s), or in multiple Mobile Network Prefix options, in the BA.

When MR-Y sends a BU to the HA requesting to have MNP1 and MNP2 assigned, the HA accepts the request for both prefixes, but indicates in the BA that MNP3 is unassigned. Again, the HA would indicate the unassignment by including MNP3 in a new mobility option, or in a Mobile Network Prefix option, in the BA. Alternatively the HA indicates in the BA the currently assigned (authorized) prefixes (in this example MNP1, MNP2 and MNP4) by including them in one or multiple new mobility option(s) or in multiple Mobile Network Prefix options.

Abruptly unassigning MNP3 has disadvantageous effects on the MNNs of the moving network. A more flexible indication that allows a graceful timeout of the assignment could therefore be preferable. An example of such a flexible indication would be to use one or multiple new mobility option(s) including all the prefixes that are assigned before the unassignment (i.e. MNP1, MNP2, MNP3 and MNP4 in this example), each with an associate lifetime. The lifetime associated with a prefix to be unassigned (MNP3 in our example) should be set to a small value suitable for graceful timeout of the validity of the prefix. Absence of an associated lifetime for a prefix would mean that the overall Lifetime field of the BA is valid for the prefix Possibly there should also be an "assignment status flag" associated with each prefix, set to "unassigned" for MNP3 and "assigned" for the other prefixes, to indicate to the MR that it need not send a new BU for the unassigned prefix (MNP3) when its brief lifetime expires.

Using the Solution in an IPv4 Environment

The basic solution was described in conjunction with the NEMO Basic Support protocol, which is defined only for IPv6. However, the principles and mechanisms of the NEMO Basic Support protocol, as well as the major parts of the basic solution of this invention, can be generalized to work also in an IPv4 environment.

For the NEMO Basic Support protocol this means that the protocol should be specified in terms of extensions to Mobile IPv4 (MIPv4) [described in C. Perkins et al., "IP Mobility Support for IPv4", RFC 3344, August 2002) instead of extensions to MIPv6.

For the basic solution of the invention adaptation to IPv4 implies that all IPv6 prefixes and addresses are replaced by IPv4 prefixes and addresses. Using a dedicated MR advertisement message is preferred over ICMPv4 router advertisements, because the ICMPv4 router advertisement messages have no inherent extension mechanism (like the backwards compatible options in IPv6 router advertisements). Moreover, there is no NUD mechanism in IPv4, which means that the features/alternatives of the basic solution that utilizes NUD cannot be used with IPv4.

A possible alternative to specifying the NEMO Basic Support protocol in terms of MIPv4 extensions is to use an available mechanism for running MIPv6 over IPv4 (such mechanisms are being worked on in the IETF) to run the NEMO Basic Support protocol in an IPv4 environment. If the interior of the moving network is based on IPv6, no further adaptation is needed. If the interior of the moving network is based on IPv4, the rest of the above described adaptations (i.e. excluding specifying the NEMO Basic Support protocol in terms of MIPv4 extensions) are needed.

It should be noted that the present invention is not limited to IPv4 or IPv6 or other specified protocols. While the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. A first mobile router, MR, connectable to a first moving network associated to a home agent, HA, the first moving network comprising at least a second MR, wherein each of the MRs is adapted to have a relation with said HA and to be assigned a first set of network prefixes identifying the first moving network, the first MR comprising:
means for determining if the first moving network is split into a second and a third moving network such that the first MR belongs to the second moving network,
means for transmitting a request to said HA to be re-assigned the first set of network prefixes if it is determined that the first moving network is split into a second and a third moving network,
means for being re-assigned the first set of network prefixes if it is determined that the first moving network is split into a second and a third moving network and if local connectivity between the first MR and all other MRs that are assigned the first set of network prefixes is verified,
means for switching to a second set of network prefixes if it is determined that the first moving network is split into a second and a third moving network and if local connectivity between the first MR and all other MRs that are assigned the first set of network prefixes is not verified;
means for waiting a time period after determining that the first moving network has been split before transmitting a request to said HA to be re-assigned the first set of network prefixes; and
means for selecting the length of said time period based on the number of nodes in the second moving network, such that a greater number of nodes results in a longer time period than a smaller number of nodes.

2. The first MR according to claim 1, wherein the nodes are MRs.

3. The first MR according to claim 1, wherein the nodes comprise the MRs and additional nodes.

4. A first mobile router, MR, connectable to a first moving network associated to a home agent, HA, the first moving network comprising at least a second MR, wherein each of the MRs is adapted to have a relation with said HA and to be assigned a first set of network prefixes identifying the first moving network, the first MR comprising:
means for determining if the first moving network is split into a second and a third moving network such that the first MR belongs to the second moving network,
means for transmitting a request to said HA to be re-assigned the first set of network prefixes if it is determined that the first moving network is split into a second and a third moving network,
means for being re-assigned the first set of network prefixes if it is determined that the first moving network is split into a second and a third moving network and if local connectivity between the first MR and all other MRs that are assigned the first set of network prefixes is verified,
means for switching to a second set of network prefixes if it is determined that the first moving network is split into a second and a third moving network and if local connectivity between the first MR and all other MRs that are assigned the first set of network prefixes is not verified;
means for waiting a time period after determining that the first moving network has been split before transmitting a request to said HA to be re-assigned the first set of network prefixes and
means for selecting the length of said time period based on a value associated with the second moving network, such that a higher value results in a longer time period than a smaller value, wherein the value is a measure of the consequences of changing the set of network prefixes such that a greater value is an indication of a greater consequence of a prefix change.

5. The first MR according to claim 2, wherein the first MR comprises means for sending MR advertising information and means for soliciting MR advertising information from other MRs and means for determining the number of MRs based on at least one of said advertising information.

6. The first MR according to claim 4, wherein the first MR comprises means for maintaining a rating value indicative of said first MR's individual perception of said value.

7. The first MR according to claim 6, wherein the first MR comprises means for determining a collective rating parameter of the individual rating parameters of the MRs in the moving network of said first MR.

8. The first MR according to claim 7, wherein the collective rating parameter is determined as a sum of the individual rating parameters of the MRs in the moving network of said first MR if the individual rating parameters are based on input data that pertain to properties of each individual MR.

9. The first MR according to claim 7, wherein the collective rating parameter is determined as a mean value of the individual rating parameters of the MRs in the moving network of said first MR if the individual rating parameters are based on input data that pertain to properties of the entire moving network.

10. The first MR according to claim 1, wherein the first MR comprises means for using the IPv6 Neighbor Discovery mechanism in IPv6 based moving networks or the ARP mechanism in IPv4 based moving networks, or the ICMPv6 Echo Request/Reply mechanism in IPv6 based moving networks or the ICMPv4 Echo/Echo Reply mechanism in Ipv4 based moving networks or layer 2 specific mechanisms or a combination thereof to determine the number of nodes.

11. The first MR according to claim 1, wherein the first MR comprises means for receiving originating MR advertisement information indicating that another identifiable MR that used to share the same set of network prefixes as said MR has switched to a new set of network prefixes.

12. The first MR according to claim 11, wherein the first MR comprises means for transmitting a request to the HA to be assigned the new set of network prefixes.

13. The first MR according to claim 1, wherein the first MR comprises means for sending MR advertisement information when a new set of network prefixes is assigned to said MR.

14. The first MR according to claim 1, wherein the request to be assigned a set of network prefixes is transmitted as a Binding Update.

15. The first MR according to claim 1, wherein the first set of network prefixes comprises one network prefix.

16. The first MR according to claim 1, wherein the first MR comprises means for sending replicated MR advertisement information received from other MRs.

17. The first MR according to claim 1, wherein the first MR comprises means for receiving replicated MR advertisement information from other MRs and means for determining the number of MRs based on said advertisement information.

18. The first MR according to claim 1, wherein it comprises means for advertising prefix information received from other MRs.

19. A method in a first mobile router, MR, connectable to a first moving network associated to a home agent, HA, the first moving network comprising at least a second MR, wherein each of the MRs is adapted to have a relation with said HA and to be assigned a first set of network prefixes identifying the first moving network, the method comprising the steps of:
  determining if the first moving network is split into a second and a third moving network such that the first MR belongs to the second moving network,
  transmitting a request to said HA to be re-assigned the first set of network prefixes if it is determined that the first moving network is split into a second and a third moving network, and
  being re-assigned the first set of network prefixes if it is determined that the first moving network is split into a second and a third moving network and if local connectivity between the first MR and all other MRs that are assigned the first set of network prefixes can be verified,
  switching to a second set of network prefixes if it is determined that the first moving network is split into a second and a third moving network and if local connectivity between the first MR and all other MRs that are assigned the first set of network prefixes is not verified;
  waiting a time period after determining that the first moving network has been split before transmitting a request to said HA to be re-assigned the first set of network prefixes: and
  selecting the length of said time period based on the number of nodes in the second moving network, such that a greater number of nodes results in a longer time period than a smaller number of nodes.

20. A method in a first mobile router, MR, connectable to a first moving network associated to a home agent, HA, the first moving network comprising at least a second MR, wherein each of the MRs is adapted to have a relation with said HA and to be assigned a first set of network prefixes identifying the first moving network, the method comprising the steps of:
  determining if the first moving network is split into a second and a third moving network such that the first MR belongs to the second moving network,
  transmitting a request to said HA to be re-assigned the first set of network prefixes if it is determined that the first moving network is split into a second and a third moving network, and
  being re-assigned the first set of network prefixes if it is determined that the first moving network is split into a second and a third moving network and if local connectivity between the first MR and all other MRs that are assigned the first set of network prefixes can be verified,
  switching to a second set of network prefixes if it is determined that the first moving network is split into a second and a third moving network and if local connectivity between the first MR and all other MRs that are assigned the first set of network prefixes is not verified,
  waiting a time period after determining that the first moving network has been split before transmitting a request to said HA to be re-assigned the first set of network prefixes and
  selecting the length of said time period based on a value associated with the second moving network, such that a higher value results in a longer time period than a smaller value, wherein the value is a measure of the consequences of changing the set of network prefixes such that a greater value is an indication of a greater consequence of a prefix change.

* * * * *